United States Patent [19]
Davis et al.

[11] Patent Number: 5,343,016
[45] Date of Patent: Aug. 30, 1994

[54] MICROPROCESSOR CONTROLLED WELDING APPARATUS

[75] Inventors: Clint A. Davis, League City; Melvin P. Trail, Houston, both of Tex.

[73] Assignee: Texas Industrial Gas, Houston, Tex.

[21] Appl. No.: 950,193

[22] Filed: Sep. 22, 1992

Related U.S. Application Data

[63] Continuation of Ser. No. 256,401, Oct. 11, 1988, Pat. No. 5,149,940, which is a continuation of Ser. No. 879,318, Jun. 27, 1986, Pat. No. 4,812,202, which is a continuation of Ser. No. 817,258, Jan. 8, 1986, abandoned, which is a continuation of Ser. No. 762,696, Aug. 5, 1985, abandoned, which is a continuation of Ser. No. 469,519, Feb. 24, 1983, Pat. No. 4,561,059.

[51] Int. Cl.$^5$ .............................. B23K 9/095
[52] U.S. Cl. .................. 219/130.4; 219/130.5
[58] Field of Search ........... 219/130.4, 130.31, 130.32, 219/130.33, 137 PS, 124.22, 130.5

[56] References Cited

U.S. PATENT DOCUMENTS

| | | | |
|---|---|---|---|
| 3,141,085 | 7/1964 | Manz | 219/130.4 |
| 4,320,282 | 3/1982 | McDonald et al. | 219/130.4 |

FOREIGN PATENT DOCUMENTS

| | | |
|---|---|---|
| 2459309 | 6/1976 | Fed. Rep. of Germany . |
| 2715644 | 10/1978 | Fed. Rep. of Germany ............... 219/124.22 |

*Primary Examiner*—Clifford C. Shaw
*Attorney, Agent, or Firm*—Honigman Miller Schwartz & Cohn

[57] ABSTRACT

A microprocessor-controlled arc welding power supply is disclosed. A silicon controlled rectifier ("SCR") bank is used to generate a direct current arc welding current under program control. Positive synchronization is provided by the microprocessor using a phase locked loop and a polarity detector, so that the gating signals applied to the SCRs are correctly timed. Optimum tradeoffs between hardware and software are accomplished by using look up tables to store correction factors that can be quickly accessed during execution, and by using timers as smart interface chips to fire the SCRs at the same angle during each cycle until changed or updated by the microprocessor. The arc welding power supply is capable of operating in a constant current or constant voltage mode without rewiring the circuit.

6 Claims, 12 Drawing Sheets

(ONE OF SIX IDENTICAL CIRCUITS)

MICROPROCESSOR CONTROLLED WELDING APPARATUS

This is a continuation of application Ser. No. 256,401, filed Oct. 11, 1988, now U.S. Pat. No. 5,149,940, which was a continuation of application Ser. No. 879,318, filed Jun. 27, 1986, now U.S. Pat. No. 4,812,202, which was a continuation of application Ser. No. 817,258, filed Jan. 8, 1986, now abandoned, which was a continuation of application Ser. No. 762,696, filed Aug. 5, 1985, now abandoned, which was a continuation of application Ser. No. 469,519, filed Feb. 24, 1983, now U.S. Pat. No. 4,561,059.

BACKGROUND OF THE INVENTION

This invention relates to arc welding power supplies, and, more specifically, to an improved apparatus providing a programmable arc welding power supply capable of operating in a constant current mode, constant voltage mode, constant power mode, or other welding modes without hardware reconfiguration, as well as providing great flexibility and capabilities not presenting conventional systems.

In the past, it was not possible to use a single arc welding power supply to operate in a constant current mode and also a constant voltage mode without a hardware reconfiguration. A separate arc welding power supply would have to be used for each mode. Precise control of arc welding modes was not practical. The quality of a weld performed with an arc welding mode was dependent upon operator skill, and consistency of welds could be very difficult to obtain.

Some attempts have been made in the past to monitor a weld, sometimes in a crude fashion. For example, U.S. Pat. No. 4,093,844, issued to Fellure et al., represents an attempt to use an optical device to optically sense an arc, which is a crude way to monitor an arc welding procedure. Efforts to control arc length by optical scanning have been less than satisfactory. It is hardly possible to maintain a constant voltage during arc welding, or to maintain a constant current during arc welding, using nothing more than optical scanning to monitor the weld.

In the past, attempts have been made to tap the primary of the transformer used in a welding power supply. For example, U.S. Pat. No. 4,024,371, issued to Drake, represents an attempt to simply monitor a weld, and to measure the power factor on the primary of the transformer. The impedance of the weld is monitored. A computer is proposed to monitor the weld, compute statistical information concerning the weld, and if the impedance value measured for the weld is outside certain user defined limits, the computer may indicate to an operator that the weld should be rejected. The Drake device is limited to use in connection with a pulse type welder. Drake proposes the use of a timing circuit and a clock circuit which generates pulses which are counted as a means for timing a period which is assumed to be sufficient for a particular welding procedure. The technique of counting pulses in a pulse welder or resistance welder is an unsatisfactory means for controlling power output in an arc welding device.

Others have attempted to use a microprocessor's cycle time or time for executing one instruction cycle for timing purposes, the microprocessor becoming little more than a digital timer. Such attempts have often involved the use of the microprocessor to count weld cycles. An example of such a device is proposed in U.S. Pat. No. 4,104,724, issued to Dix et al. It is unsatisfactory to have to program a welding procedure in terms of number of weld cycles, because the number of weld cycles necessary may vary for a given weld, must be determined empirically, and such control techniques are totally generally inapplicable to arc welding modes. The Dix device is a spot welder, using a single phase alternating current power supply. Such control techniques are not applicable to three-phase direct current arc welding power supplies. In Dix, significantly, the illustrative microprocessor is not inside a feedback loop, but is generally used as a sophisticated timer.

There is a need for a programmable arc welding power supply, capable of controlling three phase direct current arc welding power supplies. There is a need for a programmable controller which senses current, voltage, or both, directly (instead of attempting to measure the impedance of a weld), and which is capable of adjusting the circuit parameters in a manner which causes the current, or voltage, or both, to conform to program control. There is a need for a programmable control system which directly measures current, voltage, or both and computes the first derivative of the welding current or voltage function and uses that computation as an indication of the rate of change of the welding current or voltage, which may then be used for positive control of the current or voltage, or both.

In the past, it has been necessary to completely rewire a device if it was necessary to switch from, for example, a constant voltage mode to a constant current mode. There is a need for a programmable arc welding power supply that is capable of operating in a constant voltage mode, a constant current mode, or even a constant power mode, without requiring the circuit to be rewired. There is a need for a single welding power supply which is capable of operating in all common arc welding modes.

In the past, robot devices, which are typically digital, have had to interface with welding devices, which were analog or only accepted analog input. Control has often been accomplished by translating information to a zero to ten volt analog signal, for example, which is then sent from one device to the other where the analog signal must be used, or perhaps translated back to a digital signal. This has not provided precise positive control or communication between the robot device and the welding device. Such an approach requires precise calibration of the analog to digital conversion process, and may be susceptible to the introduction of noise and errors. There has been a need for a programmable arc welding power supply controller which is capable of accomplishing direct communication to a robot device using digital data.

Conventional methods of starting a TIG weld have involved the use of high frequency pulses at voltages on the order of 15,000 to 20,000 volts. Such methods tend to cause electromagnetic interference (EMI) or radio frequency interference (RFI). EMI or RFI can interfere with the proper operation of robots, as well as other devices and instruments. There is then a need for a TIG start weld method which avoids the use of high frequency, high voltage pulses.

Other conventional attempts to start TIG welding procedures have involved the use of what is commonly referred to as a scratch start. The tungsten tip of a welding lead is quickly scratched across the metal to be welded in order to start an arc. This must be done quickly in order to avoid the tungsten tip from being welded to the metal work piece. This procedure often damages the tungsten tip and tends to contaminate the metal work piece with tungsten.

There is a need in the art for an intelligent or smart arc welding power supply which is capable of sensing contact with the metal work piece, capable of sensing the establishment of an arc utilizing a background supply, and capable of ramping up the main power supply current upon establishment of an arc.

It will be appreciated from the above discussion that arc welding supplies in the prior art leave room for significant improvement. The present invention is believed to represent an advance and improvement over prior art arc welding power sources.

SUMMARY OF THE INVENTION

A microprocessor controlled arc welding apparatus may, in a preferred embodiment, include the features of a three-phase transformer, preferably six SCRs connected between the transformer and a common welding lead, where the SCRs are used to control the amount of current or voltage which is output onto the common welding lead. A sensor is coupled to the common welding lead for directly sensing either the current, or the voltage, or both.

The present invention includes the feature of a microprocessor, having an input port coupled to the voltage and current sensors, a memory, and an output port coupled to the SCRs so that the microprocessor can control the firing angle of the SCRs in order to control the voltage or current which is output to the common welding lead.

A significant feature of the present invention involves the method of synchronizing to both the frequency and the phase of the AC power signal. If the firing angle of the SCRs is to be controlled by the microprocessor, it is extremely important that the microprocessor have a mans for positively synchronizing to the AC wave form which appears at the secondary of the transformer and which is coupled to the anode of the SCRs. The present invention features a phase locked loop which locks onto the frequency of the AC waveform, and which provides the capability of operation over a variable range of AC line frequencies, and also maintains synchronization even if the AC line frequency varies, as could easily be the case where a portable diesel generator may be used to generate the AC line signal in the case of a portable welding apparatus. However, the phase locked loop sacrifices phase information in accomplishing its frequency lock on. The signal generated by the phase locked loop will typically be out of phase with the AC wave form. The present invention includes the feature of a polarity detector, which generates signals that are coupled to the microprocessor and evaluated by the microprocessor to synchronize with the phase of the AC waveform.

The present invention includes the feature of timing circuits which are set by the microprocessor responsive to the information provided by the phase locked loop and the polarity detector, in order to generate interrupts at six times the AC line frequency. These interrupts, which are synchronized with the AC waveform, may then be used to control the timing circuits which are used to generate firing signals for the SCRs. The present invention includes the significant feature of positive synchronization of the firing signals which are supplied to the SCR bank with the AC line frequency, thereby accomplishing positive control of the output applied to the common welding lead. This feature is superior to prior crude proposals which involved counting weld cycles using an internal crystal oscillator or the microprocessor's instruction cycle time as a means for timing welding procedures.

The present invention includes the feature of providing an economical and efficient microprocessor controlled arc welding supply which provides an optimum trade off between hardware and software. The invention includes the feature of a look-up table which is stored in memory and which permits the microprocessor to quickly determine a proper correction to be applied to the gating signal which is used to fire the SCRs when the microprocessor determines an error between the sensed voltage or current and a reference voltage or current which is desired to be maintained by the arc welding power supply.

The invention includes the feature of providing the capability of computing a first derivative parameter which is indicative of the rate of change of the welding current or voltage, and the capability of utilizing this first derivative parameter to accurately control the output of the apparatus.

The invention includes the capability of sensing external switches or other derives, and the capability for responding intelligently to such sensed inputs in accordance with program control. For example, the invention includes the capability for sensing the appropriate location at which to start a weld, and the ability to sense a location at which a weld should be stopped. The invention includes the capability of receiving input from an operator defining a desired welding procedure and either a constant current mode, constant voltage mode, or some other desired welding mode, and then controlling the arc welding power supply precisely to provide the user desired welding procedure. The invention includes the capability of sensing signals from a robot and responding intelligently to such signals.

The invention includes the capability for controlling various outputs. The invention includes the capability for controlling weld functions such as wire feed, inert gas flow (such as shielding gases), turning on and off a background voltage, signaling a robot to begin movement of a work piece to be welded, outputting to a printer a stream of data indicating quality control data such as the voltage and current which occurred at selected intervals during a welding procedure, prompts to an operator to perform certain operator initiated functions, as well as numerous other functions. The invention even includes the feature of automatically disconnection the transformer when the apparatus is in a standby mode in order to reduce the amount of wasted power consumed by the transformer. The machine further includes the feature of providing an input/output data port which is capable of providing direct digital communication of digital data to an external digital device such as a host computer controller, a robot device, etc.

The invention provides the feature of intelligently touch starting a TIG welding mode by turning on a small background voltage, for example a 0.5 volt supply, moving the welding tip toward the work piece and sensing contact of the welding tip with the work piece by determining when the small background voltage drops to 0, turning on a higher background voltage such as an 80 volt current limited supply and withdrawing the welding tip from the work piece, measuring the establishment of a thin arc between the welding tip and work piece by sensing the voltage or current when the welding tip has been withdrawn from the work piece, then ramping up the main welding current once an arc has been established.

The invention includes the feature of providing a capability of assisting an operator in learning how to weld. In such a mode, the apparatus is capable of teaching an inexperienced operator how to weld. The machine can automatically change its settings to compensate for welder errors, and can also generate prompts and other outputs designed to instruct the welder how to correct welding errors.

In another mode referred to as "bio-feedback", the apparatus provides the capability of sensing welder's signals, which may be provided for example of momentarily dipping the welding lead closer to the work piece to cause a momentary change in the sensed voltage or current, which the microprocessor may then be programmed to interpret as a signal to change the setting of the welding apparatus, such as increase voltage, increase current or perform some other function as increase the rate of wire feed, etc.

The invention includes the feature of providing an optimum trade off between hardware and software, not only by the use of look-up tables, but also by providing timers which are configured to fire the SCRs at the same firing angle until the information in the timers is changed or updated by the microprocessor. This feature takes the load off the microprocessor of generating the gating signals which must be used to fire the SCRs, and the microprocessor's computer power is only needed in order to update the information in the timers. In other words, the timers function as smart interface chips which interface directly to the SCRs and control the SCRs responsive to information provided by the microprocessor.

DETAILED DESCRIPTION OF A PREFERRED EMBODIMENT

Figure 1:
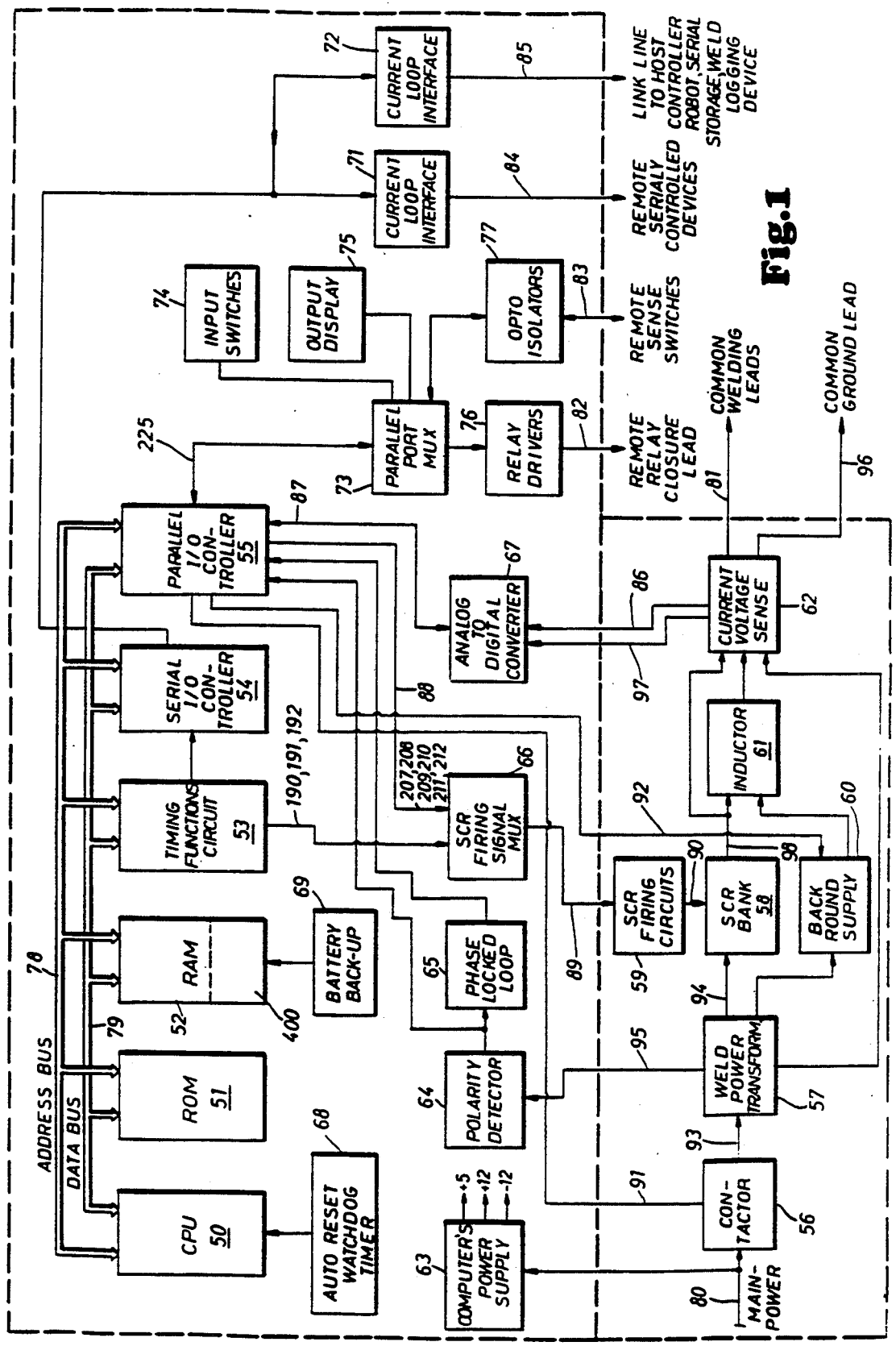
FIG. 1 is a block diagram illustrating schematically the interrelationship of the significant circuit components forming an embodiment of the present invention.

FIG. 1 shows the interrelationship of various circuits which form the present invention.

The welding apparatus draws AC power from a main power source 80. The apparatus yields a welding current or voltage between a common welding lead 81 and a common ground lead 96. A workpiece appropriately connected between the welding lead 81 and the ground lead 96 will be welded by the flow of current (in a conventional sense) from the positive common welding lead 81 to the negative common ground lead 96. The flow of welding current is developed and controlled by the circuit element illustrated in FIG. 1.

Significant components of the invention include a weld power transformer 57, an SCR bank 58, a CPU 50, and current and voltage sense elements 62. Assuming that the power is on and a welding mode has been selected by an appropriate configuration of memory 51 and 52 along with necessary inputs, power flows through the weld power transformer 57, is rectified and controlled by the SCR bank 58, and is supplied to the common welding lead 81. The sense elements 62 monitor the condition of the welding arc. The sense elements 62 communicate with the CPU 50 which compares, under program control, the actual welding conditions with the selected welding mode. The CPU signals and controls the SCRs to achieve the proper welding condition in accordance with the selected welding mode. This circuitry is capable of achieving, for example, either constant current or constant voltage arc welding, which are selectable without requiring the rewiring of circuits. Program control for both constant current and constant voltage procedures are contained in the memory 51 and 52, and are selectable by transmitting the appropriate command to the CPU 50. Since SMAW and TGAW usually require a constant current machine and MGAW requires a constant voltage machine, at least two separate conventional welding machines would have been required in the past to weld in these three most common arc welding modes. This invention provides one apparatus capable of functioning in a constant current mode, or a constant voltage mode, and which is capable of SMAW, TGAW, MGAW, SAW, as well as all arc welding modes, without hardware reconfiguration.

The invention is capable of switching substantially instantaneously between a constant voltage mode and a constant current mode, even during the course of a welding procedure. For example, the MGAW process is most easily started in a constant voltage mode, and then once the arc has been initiated, may be switched to a constant current mode. The invention is also capable of operating in a constant power mode.

The illustrated implementation of these capabilities can best be understood by referring to FIG. 1. Main power 80 is supplied to the weld power transformer 57. In a preferred embodiment, the weld power transformer 57 is a three phase transformer. The main power voltage is preferably stepped down by the weld power transformer 57 and coupled to the SCR bank 58 through conductor 94. The SCR bank 58 rectifies the alternating current on conductor 94. The SCR bank 58 preferably comprises six SCRs in a full wave, three phase rectifier configuration, sometimes referred to in the art as a six phase star. This results in a direct current output on conductor 98 having a 360 Hz ripple, if the power line frequency is 60 Hz.

In a preferred embodiment, the 360 Hz ripple may be smoothed by an inductor 61. The DC welding current is coupled to the common welding lead 81.

A significant feature of the present invention involves the direct sensing of current and voltage. Current and voltage sense elements 62 are provided which are directly connected to the common welding lead 81. In the present invention, samples of the current and voltage representative of the welding conditions at a given point in time are monitored directly at the common welding lead 81 or the common ground lead 96, rather than on the primary side of the weld power transformer 57 (such as at conductor 93). This provides more accurate control of welding conditions, and eliminates the time delays which can occur if current or voltage is sensed through the inductive winding of a transformer 57.

The amount of current or the amount of voltage appearing on conductor 98 will be determined by the SCR bank 58 responsive to gating signals fed to the SCR bank 58 through a conductor 90. The gating signals are developed by SCR firing circuits 59. The SCR firing circuits 59 develop gating signals on conductor 90 responsive to signals from the CPU 50.

It is desirable to communicate welding conditions to the CPU 50 which may be analyzed in order for the CPU 50 to provide the appropriate signals to the SCR firing circuits 59. In the illustrated embodiment, this is essentially accomplished by an analog-to-digital converter 67 which is coupled to the current and voltage sense elements 62.

The analog-to-digital converter 67 transforms the voltage signals appearing on a voltage sense conductor 86 to a digital signal which can be processed by the CPU 50. Similarly, the analog-to-digital converter 67 transforms the analog current signal appearing on a current sense conductor 97 to a digital signal which may be processed by the CPU 50. In a preferred embodiment, the analog-to-digital converter 67 is a two channel A/D converter.

In a preferred embodiment, communication to and from the CPU 50 is accomplished through a parallel I/O circuit 55. Current or voltage signals from the current or voltage sense elements 62 are transformed to digital signals by the A/D converter 67 and gated to a data bus 79 by the parallel I/O circuit 55. The digital signals from the A/D converter 67 may be stored in a random access memory or RAM 52, or temporarily placed in the CPU 50.

Timing considerations can be very significant. It is necessary that gating signals be applied to an SCR during the alternating current phase when the SCR is forward biased. Equally important, in order to correctly control the firing of the SCRs 58, it is necessary to have an accurate reference to the phase and frequency of the alternating current signal from the main power source 80 (which may vary). In the illustrated embodiment, this is essentially accomplished by a polarity detector 64, a phase locked loop 65, in cooperation with a timing function circuit 53. The phase locked loop 65 gives a reliable indication of the frequency of the AC power signal. The polarity detector 64 is used to determine phase information concerning the AC power signal.

The polarity detector 64 is coupled to the weld power transformer 57 through a conductor 95. The polarity detector 64 is tied to one phase of the alternating current signal (in the illustrated three phase embodiment), coupled to the polarity detector 64 by the conductor 95.

The phase locked loop 65 locks to the AC line frequency. The phase locked loop 65 has an internal oscillator which locks onto and synchronizes with the AC line frequency, and thus follows it. The phase locked loop 65 delivers a clean frequency reference signal to the CPU 50. This is significant, because the AC power signal is difficult to measure by other techniques, such as zero crossing detectors, due to noise, non-linearities in loads, non-linearities in the transformer 57, "ringing" introduced by inductance or otherwise, and other factors.

The frequency reference signal provided by the phase locked loop 65 is used by the CPU 50 to determine the period of the AC signal. Specifically, the CPU 50 sets section three of the triple timer 152 to zero at the start of one cycle of the frequency reference signal. Upon completion of a cycle, the phase locked loop 65 generates an interrupt to the CPU 50. When the CPU 50 receives this interrupt, it goes to the timer 152 and reads the value of section three of the triple timer 152. The elapsed time represents the period of the AC signal. Inasmuch as the period of an alternating signal is inversely related to its frequency, the frequency of the AC power signal can also be determined readily. The CPU 50 then sets section one of the triple timer 152 to generate interrupts at six times the AC line frequency. Each interrupt may be used as a reference for firing each of the six SCRs 100.

The phase locked loop 65 sacrifices phase information to obtain a frequency lock. The phase of the frequency reference signal provided by the phase locked loop 65 to the CPU 50 will typically be shifted in phase. It is desirable to obtain phase information regarding the AC power signal. In the illustrated embodiment, this is essentially accomplished by the polarity detector 64. At each interrupt, the polarity detector 64 is sampled and the timer interrupt rate is modified if necessary to cause the interrupts to occur in phase with the AC line signal.

The interrupts are used, under program control, as a reference for determining the proper control signals to be applied to the SCRs 58. Once the frequency and phase of the AC power signal are known, and interrupts are generated at six times the AC line frequency, the interrupt associated with each of the six SCRs 100 provides a reference so that each SCR 100 may be signaled after a predetermined delay from the interrupt to fire during only a portion of the AC phase (which can be accurately controlled by the CPU 50).

A significant feature of the illustrated circuit involves the ability to communicate directly with a host controller, a robot, or a remote control device using digital data. In the past, it has been common to generate an analog signal which is fed to a welding device from a robot device, which must then be converted to a digital signal. This, of course, introduces errors and has been a less than satisfactory arrangement. In the present invention, two serial I/O ports are provided. Each port is connected to a current loop interface 71 or 72 which provides a digital output 84 and 85, respectively. The output 85 or the output 84 may provide digital data to a host controller, a robot, or other digital device. Further, the present invention may be used advantageously in connection with a robot device. For example, the CPU 50 may signal a robot device to position a workpiece, such as an automobile chasis, in a manner convenient for welding. The CPU 50 may then generate a welding current between the common welding lead 81 and the common ground lead 96 in accordance with a desired welding procedure. The robot, responsive to signals from the CPU 50, may be used to move the workpiece in a manner necessary to accomplished the desired welding procedure. The robot may then signal the CPU 50 when the workpiece arrives at a position indicative of the completion of the welding procedure. The robot may the pass the workpiece to the next station in the assembly procedure, and these steps may be repeated. Significantly, the link line 85 carries digital data in the illustrated embodiment which results in significant advantages is positive communication between the CPU 50 and the robot.

Additional current loop interfaces 71 may be provided if additional output 84 are desired for communicating digital data to remote serially controlled devices.

It is desirable to provide means for accomplishing data input into the CPU 50 from an operator or remote switches which are sensed. It is further desirable to provide for the output of information in a form which may be recognized by a human operator, or which may be used to activate remotely controlled relays. In the present instance, this is accomplished by a parallel port multiplexer 73 which is electrically coupled to the parallel I/O controller 55.

The parallel port multiplexer 73 may be used to route signals to output displays 75. The output displays 75 may be in the form of panel mounted LEDs which are visible to an operator and which display information indicative of the status of current welding conditions, program control information, mode of operation, etc.

In a preferred embodiment, an operator may input information to the CPU 50 using input switches 74. The RAM 52 could be programmed in this manner. The input switches 74 are electrically coupled to the parallel I/O controller 55 through the parallel port multiplexer 73. The desired operating mode, such as constant current or constant voltage, may be entered by the input switches 74. Control information such as the desired voltage level or current level could also be entered using the input switches 74. Additionally, operator interrupts could be entered in a similar manner.

It is oftentimes desirable to sense remote switches. For example, limit switches may be used to sense remote conditions. In a preferred embodiment, opto-isolators 77 are used to isolate the parallel port multiplexer 73 from the remote sense switch output 83. The opto-isolators 77 are used to provide electro-isolation of noise and switch bounce so that a clean signal may be provided to the parallel port multiplexer 73.

It is oftentimes desirable for the CPU 50 to control remote relays or other devices through a remote relay output 82. In the present instance, this is accomplished by relay drivers 76 which are electrically coupled to the parallel port multiplexer 73. Using the relay drivers 76, the CPU 50 may signal remote relays through the remote relay output 82 which may be used to feed wire which is to be used for welding, turn on the flow of an inert gas used for shielding, activate cooling fans used to direct cooling air flow over the SCRs, etc.

It is oftentimes desirable to output information from the CPU 50 to an operator in a manner in which it can be perceived visually. In the illustrated circuit, this is essentially accomplished by the provision of output displays 75. The output displays 75 may be LED type displays. The output displays 75 may be used to output the voltage and current at any given movement during a welding procedure. The output displays 75 may be used to indicate and verify data or commands which are entered through input switches 74, or from peripherals connected to the serial ports, such as paper tape, keyboard, computer, robot, disk drive, tape drive, etc.

The parallel port multiplexer 73 controls the flow of signals to or from the input switches 74, the output displays 75, the opto-isolators 77, and the relay drivers 76. The parallel port multiplexer 73 insures that a signal from the CPU 50 which is directed to the output displays 75 is correctly routed to the displays 75, for example.

It is oftentimes desirable to provide means for supplying a voltage of a predetermined level between the common welding lead 81 and the common ground lead 96. It is often desirable to present a certain open voltage between the leads 81 and 96. This is often used to assist in overcoming the resistance at the surface of the workpiece which is typically present during a cold start of a welding operation. Initially, a workpiece presents a higher resistance. After welding current begins to flow and an arc is developed, the ionization of the immediately surrounding area and the heating of the workpiece will present a lower resistance to the welding apparatus.

In a preferred embodiment, a background supply 60 is provided. The background supply 60 is electrically coupled to the common welding lead 81. The background supply 60 may be used to develop an open circuit voltage between the lads 81 and 96. In addition, the background supply 60 may be used to smooth ripples in the welding current provided by the SCR bank 58.

In the illustrated embodiment, the weld power transformer 57 draws a significant amount of power even when the SCR bank 58 is not conducting. Much of this power is dissipated in the form of undesirable heat. A contactor 56 is preferably provided to disengage the weld power transformer 57 from the main power source 80 during periods when welding operations are not being performed. The contactor 56 is electrically coupled to the parallel I/O controller 55 through conductor 91. The CPU 50 signals the contactor 56 on conductor 91 through the parallel I/O controller 55. The contactor 56 disengages power coupled on conductor 93 to the weld power transformer 57 responsive to the signals from the CPU 50. To prolong the life of the contactor, it should not be switched while the power source is under load.

After a predetermined delay, the CPU 50 may signal the contactor 56 to disconnect the weld power transformer 57. Alternatively, the CPU 50 may be instructed, using program control contained in memories 51 or 52, to signal the contactor 56 at a predetermined time. Once disconnected, the contactor 56 is responsive to signals from CPU 50 to reconnect the weld power transformer 57 when desired. The provision of the contactor 56 to disconnect the weld power transformer 57 significantly reduces the amount of power that the circuit draws when the circuit is on standby.

A computer power supply 63 is connected directly to the main power source 80, and is preferably not disconnected by the contactor 56. The computer power supply 63 provides power to the CPU 50, the ROM 51, the RAM 52, the time and function circuit 53, the serial I/O controller 54, the parallel I/O controller 55, etc. It will be appreciated that the CPU 50 remains activated even when the weld power transformer 57 is disconnected by the contactor 56. In other words, the invention retains its control ability even when the apparatus is in a standby mode.

An auto reset 68 is provided coupled to the CPU 50. The auto reset 68 may be used to boot the system when the circuit is initially powered up. A watch dog timer 68 is also provided to reset the CPU 50 if a malfunction occurs.

A battery backup 69 is preferably provided for the RAM 52 to prevent the loss of data during a temporary loss of power, and to retain the information in memory during periods when power to the apparatus is shut down.

Figure 2:
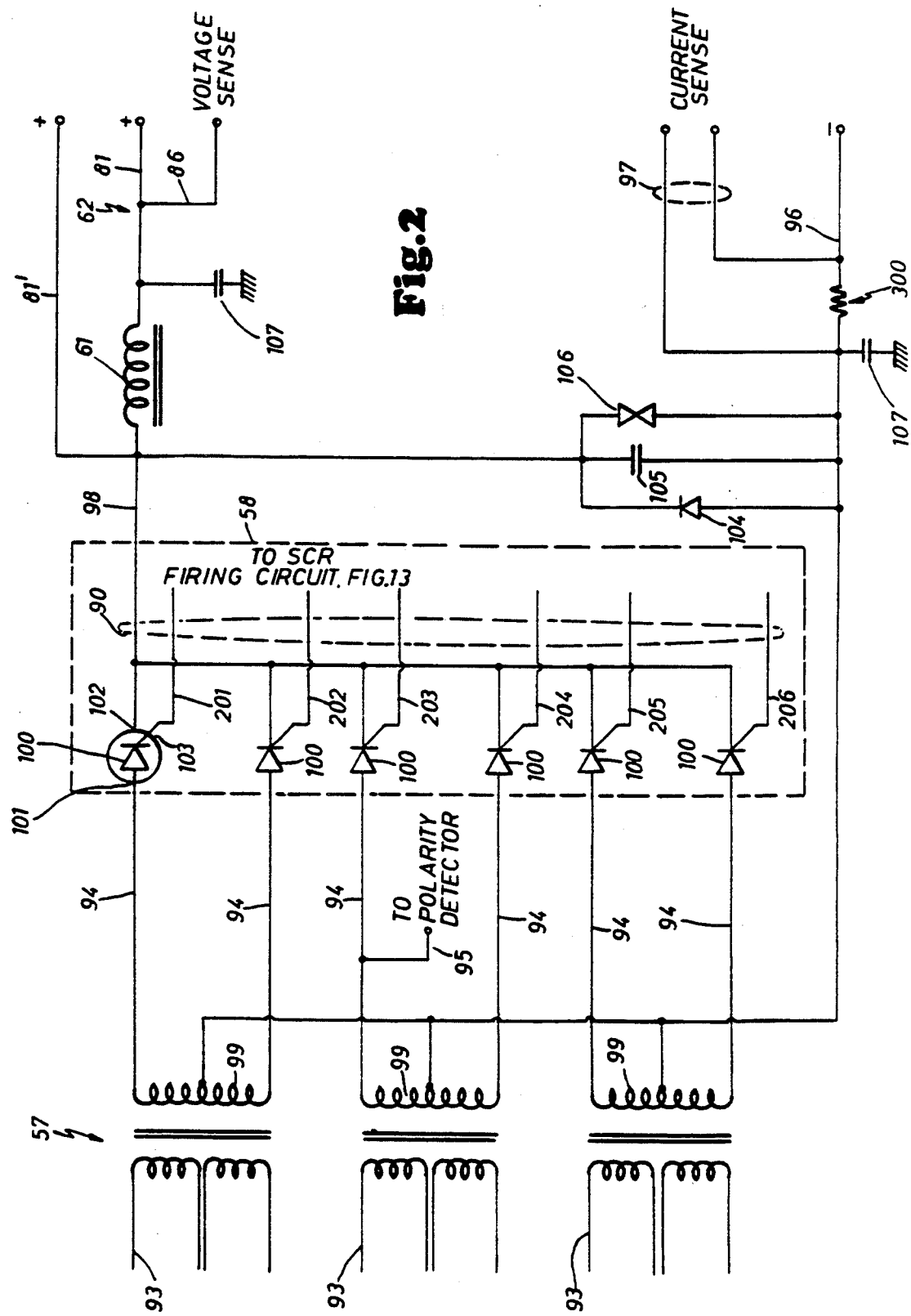
FIG. 2 is a schematic diagram of the weld power transformer, the SCR bank, the inductor, and the current and voltage sense circuits.

The operation of the SCR bank 58 may be better understood with reference to FIG. 2. In a preferred embodiment, the weld power transformer 57 is a three-phase power transformer. Conductors 93 connect primary windings of the three-phase transformer 57 to a main source of power 80. The three-phase transformer 57 has secondary windings coupled through conductors 94 to SCRs 100. In the illustrated embodiment, the conductors 94 are connected to the anodes of the SCRs 100.

The cathodes of the SCRs 100 are connected together to a conductor 98 and fed to the inductor 61.

The electrical signal on conductors 94 is an alternating current signal, preferably a sine wave. The SCRs 100 will be forward-biased during one-half of the AC cycle. When the SCR 100 becomes forward-biased, the SCR 100 will not conduct current through to the conductor 98 until a firing signal is applied to the gate 103 of the SCR 100. Using the gates 103 of the SCRs 100, it is possible to control the flow of welding current on the conductor 98.

If a firing signal is applied to the gate 103 at the SCR 100 during the initial portion of the forward-biased half of the AC wave form, the maximum amount of current will flow through the SCR 100 to the conductor 98. Conversely, if a gating signal is applied to the gate 103 late in the alternating current cycle, the average current flowing through the SCR 100 to the conductor 98 will be less.

In a preferred embodiment, six SCRs 100 are utilized. Under normal conditions, an individual SCR 100 will conduct only during a portion of the AC cycle. However, the output from all six SCRs 100 are summed together and fed to the conductor 98 to provide a smoother direct current signal to the common welding lead 81. The DC current flowing on conductor 98 will ordinarily have a ripple at six times the line frequency. In the case of a 60 Hz power line frequency, the ripple will be at 360 Hz.

An inductor 61 is provided to smooth the 360 Hz ripple on the signal appearing on conductor 98. This results in a smoother DC signal at the common welding lead 81.

In a preferred embodiment, a voltage sense element 62 is connected to the common weld lead 81 and coupled through conductor 86 to the analog-to-digital converter 67. In the illustrated embodiment shown in FIG. 2, the voltage sense element 62 is a direct connection 86 to the lead 81.

It may be desirable to provide a means for eliminating the inductor 61 when its filtering action is not desired. In the embodiment illustrated in FIG. 2, an alternative common welding lead 81' is provided which bypasses the inductor 61 and is connected directly to the conductor 98.

In the illustrated embodiment shown in FIG. 2, a current sense cable 97 is connected as shown to a shunt 300 inserted in the common ground lead 96. The voltage developed across the shunt 300 will be directly proportional to the value of the current.

In the illustrated embodiment, further filtration, and voltage spike protection is provided by a diode 104, a capacitor 105, and an MOV device 106, which are connected in parallel between the conductor 98 and the common ground lead 96. Additional filtering and noise suppression may be provided by capacitors 107 connected as shown in FIG. 2.

Figure 13:
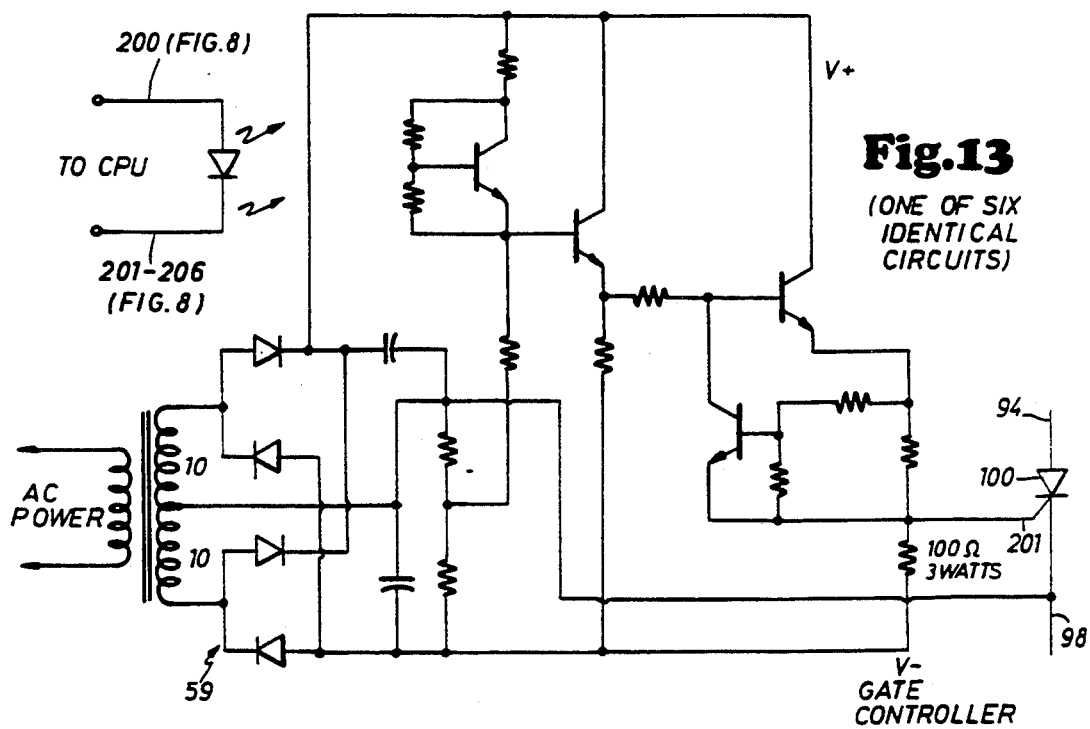
FIG. 13 is a schematic diagram showing one of the SCR firing circuits in more detail.

The gates 103 of the SCRs 100 are connected through conductors 90 to SCR firing circuits 59 (shown in more detail in FIG. 13). The SCR firing circuits 59 provide signals in response to signals received from the CPU 50 to fire the SCRs 100 during the appropriate portion of the AC cycle in order to obtain the desired welding current on conductor 98. The timing of the gating signals applied to the gates 103 of the SCRs 100 determines the average current or average voltage which appears on the conductor 98. The average current or average voltage on conductor 98 may be increased by shortening the delay between the time that the AC signal on conductor 94 crosses zero and forward biases the SCR 100, and the time that the firing signal is applied to the gate 103 of the SCR 100. Conversely, the average current or average voltage on conductor 98 may be decreased by lengthening the delay between the zero crossing of the AC signal on conductor 94 and the firing signal applied to the gate 103 of the SCRs 100. This timing is determined by the CPU 50 under program control.

In order to accurately calculate the delay in initiating the SCR firing circuit signal, it is desirable to have a reference to the phase and frequency of the AC signal from the secondary 99 of the transformer 57. In the illustrated embodiment, this is accomplished by conductor 95 which is connected to one side of a secondary winding 99 of the transformer 57. The conductor 95 is connected to the polarity detector circuit 64. The signal sensed through conductor 95 may be used as a reference which may be used by the CPU 50 to synchronize the interrupts generated by the timer chip 152 so that the interrupts are in phase with the AC line frequency. Then the CPU 50 may accurately determine the appropriate delay for the firing signals to be supplied to the gates 90.

The preferred embodiment includes the capability of individually controlling the delay for the gating signal supplied to each gate 103 of each SCR 100. This provides the capability of generating complex wave forms, if desired, or to compensate for variations in circuit components, or both.

A significant feature of the present invention involves the calculation of the desired timing for the SCR firing signals during each alternating current phase of the signal at conductor 95. As described more fully above, the phase locked loop 65 is synchronized with the frequency of the AC power signal, and provides a reliable measure of the period of the AC power signal. The elapsed time since the last zero crossing of the frequency reference signal is computed to determine the period of the AC wave form. Six interrupts are generated for each period (one interrupt for each SCR 100). During each cycle of the AC wave form, the zero crossing of the AC signal is sensed, and used to synchronize the interrupts with the phase of the AC wave form. The six interrupts divide the period of the AC wave form preferably into six equal subperiods, which are used as a reference for firing each individual SCR 100. (It may be desirable to make the subperiods unequal, as described more fully hereinafter).

The period of the AC wave form is recalculated for each cycle of the phase locked loop. Variations in the alternating current frequency will not affect circuit operation. Significantly, the apparatus will work on 60 hz AC power, 50 Hz AC power (as is common in Europe), or even on a variable frequency source such as that generated by a diesel generator, or various alternating current frequencies which may be available, This feature of the present invention provides positive synchronization which is crucial in accurately controlling the welding signal which is developed on conductor 98. If the circuit is not appropriately synchronized to the AC wave form, then the delay in firing the gate 103 of the SCRs 100 cannot be accurately determined.

Figure 3:
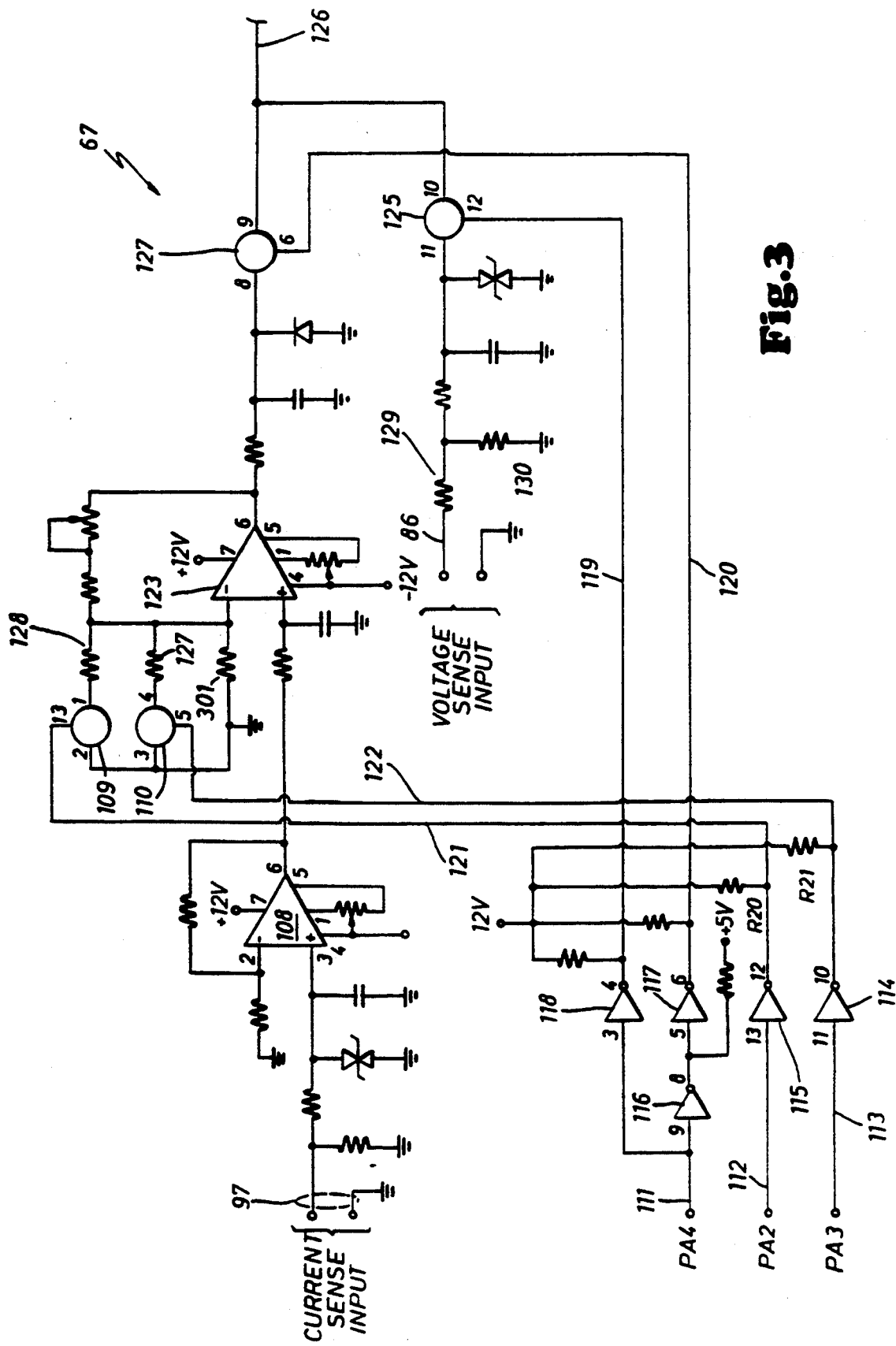
FIGS. 3 and 4 are schematic diagrams illustrating the analog-to-digital converter.
Figure 4:
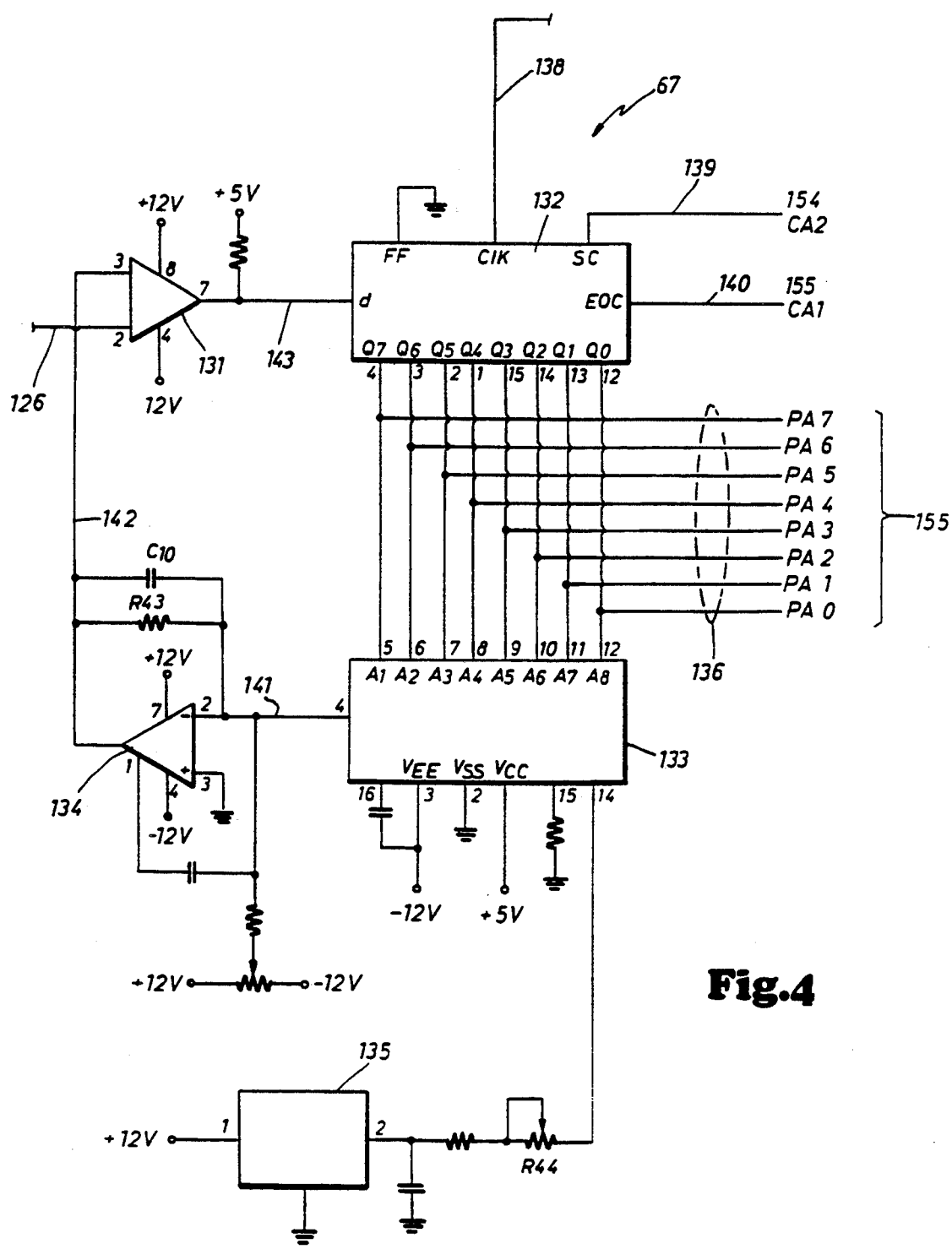

The operation of the analog-to-digital converter circuit 67 can best be understood with reference to FIG. 3 and FIG. 4.

It is desirable to sense the current and/or voltage representative of the welding conditions. A current sense input is provided through cable 97 to the analog-to-digital converter circuit 67, as shown in FIG. 3. It is desirable to amplify the signal on conductor 97 prior to converting the signal, in an analog form, to a digital signal which may be processed by the CPU 50. In the illustrated embodiment, this is accomplished initially by an operational amplifier 108. The current sense input is coupled through the conductor 97 to the op amp 108. In a preferred embodiment, the op amp 108 is designed to have a gain of 12.54.

The output from the op amp 108 is then electrically coupled to a second operational amplifier 123. It is desirable to vary the gain of the op amp 123 to provide a series of ranges for the current sense input 97. It is further desirable that this range selection be provided in response to signals from the CPU 50. In the illustrated embodiment, this is essentially accomplished through conductors 112 and 113, which are coupled to the CPU 50. In a preferred embodiment, the signal at conductors 112 and 113 will have a value which may be interpreted as either a logic one or logic zero.

The gain of op amp 123 is determined in part by feedback resistor 301. The gain of op amp 123 may be varied by reducing, or increasing, the effective feedback resistance. The effective feedback resistance may be reduced by connecting a second feedback resistor 127 in parallel with the first feedback resistor 301. In the illustrated embodiment, this is accomplished by an analog switch 110.

The analog switch 110, responsive to a signal on conductor 122, will effectively connect or disconnect the second feedback resistor 127 from the circuit. Signals from the CPU 50 are fed through conductor 113, through inverter 114 to conductor 122, which is in turn connected to the analog switch 110.

Thus, the CPU 50, signaling the analog which 110 through conductor 113, may change the gain of op amp 123 by coupling a second feedback resistor 127 in parallel with the first feedback resistor 301. The CPU 50 can therefore adjust the range of values which may be conveniently sensed through the current sense input 97.

Similarly, the CPU 50 may apply a logic signal to conductor 112 through inverter 115, through conductor 121 to a second analog switch 109. The second analog switch 109 is operative to connect a third feedback resistor 128 in parallel with the first feedback resistor 301 and the second feedback resistor 127, to adjust the effective feedback resistance to a desired value. As a result, the operational amplifier 123 is capable of providing three ranges of amplification to the input provided at conductor 97 in response to signals from the CPU 50.

In the illustrated example, the three ranges of the op amp 123 result in a scale such that a register 132 shown in FIG. 4 has one count per ampere for one range, one count per two amps for a second range, and one count per four amps for a third range.

In the embodiment illustrated in FIG. 3, the amplification provided by op amps 108 and 123 is required because the value of the shunt resistor 62 is preferably kept small to mimimize the voltage drop which appears across the shunt 62.

When the analog switch 124 is enabled, the output from the current sense amplifiers 108 and 123 is coupled to conductor 126. A voltage sense input may also be applied to conductor 86. This is coupled through a voltage dividing network 129 to an analog switch 125.

When the analog switch 125 is enabled, the voltage sense input is coupled to conductor 126.

It is desirable to allow the processor to selectively determine whether the current will be sensed, or whether the voltage will be sensed by the CPU 50. In the illustrated embodiment, this is essentially accomplished by providing a sense select control line 111 which is coupled to the CPU 50. In a preferred embodiment, the signal at conductor 111 will be interpreted as either a logic one or a logic zero. The signal at the sense select control input 111 is coupled through an inverter 118 along conductor 119 to the analog switch 125. The signal conductor 111 is also connected through inverts 116 and 117 along conductor 120 to the analog switch 124. It will be appreciated that the logic signal on conductor 119 will be the complement of the logic signal on 120. In other words, when the signal on conductor 119 is in a logic state of one, the signal on conductor 120 will be in a logic state of zero. This insures that the current sense input and the voltage sense input cannot both be simultaneously coupled to conductor 126. Thus, depending on whether conductor 119 or conductor 120 is enabled, the analog switches 125 and 124, respectively, will couple either the voltage sense input or the current sense input to conductor 126. Thus, the CPU 50 may select the desired input to be sensed.

It is desirable to convert the analog signal appearing on conductor 126 into a digital signal which may be processed by the CPU 50. In the illustrated embodiment, this is essentially accomplished by the circuit illustrated in FIG. 4. In the illustrated embodiment, the signal appearing on conductor 126 may have a range from 0.0 to 5.12 volts. This analog signal is converted into a digital signal having a value between hexadecimal zero and FF (which is between 0 and 255 in the decimal counting system).

Referring to FIG. 4, the analog signal on conductor 126 is representative of either the current or the voltage of the weld, which is selected by the CPU 50. This signal is fed to a two-input comparator 131. The analog signal on conductor 126 is compared with the signal on conductor 142.

The output of the comparator 131 is fed to a successive approximation register 132. The successive approximation register 132 is coupled as shown to an eight bit D to A converter 133. The D to A converter 133 has an output 141 connected to an operational amplifier 134, the output of which is fed through conductor 142 back to the two-input comparator 131. A voltage reference is provided by a precision voltage reference 135.

The circuit operation starts when the CPU 50 signals the successive approximation register 132 by enabling a start convert line 139. Responsive to the start convert signal from the CPU 50, the successive approximation register 132, in essence, guesses the value of the signal on conductor 126. This "guess" is converted by the eight bit D to A converter 133 to an analog signal at output 141. This signal is amplified by the op amp 134 and fed through conductor 142 into the two-input comparator 131. The comparator 131 compares the guess with the signal on conductor 126. The comparator 131 generates an output on comparator output line 143 which is fed back to the successive approximation register 132. The comparator output 143 will be a logic one or zero depending upon whether the "guess" is two great or too little. The successive approximation register 132 then selects a second guess responsive to the comparator error signal 143. The process is repeated and the output at conductor 142 is again compared with the current or voltage signal appearing on conductor 126. Generally speaking, each "guess" of the successive approximation register 132 will be closer and closer to the actual value of the voltage or current on conductor 126. In other words, the value in the successive approximation register 132 will converge upon a limit represented by the value of the signal on conductor 126.

The successive approximation register 132 continues to change the value in its register to a value closer and closer to the value of the current or voltage signal at conductor 126 until, for the illustrated example, eight successive guesses have been made. This results in a value that is within less than ½ of one percent of the actual voltage. The CPU 50 waits a sufficient period of time to allow the register 132 to complete its conversion, then reads out the value contained in the eight bit successive approximation register 132 through the input port, indicated generally in FIG. 4 by reference numeral 136.

The D to A converter 133 is preferably an MC 1480L8 chip. The successive approximation register 132 is preferably a 40549 chip.

In the illustrated embodiment, a clock signal is provided through conductor 138 to the register 132. This clock signal comes from the serial I/O port. In other words, the successive approximation register 132 uses a clock signal derived from the baud rate generator of the serial I/O port. In the illustrated example, the clock for the register 132 runs at a frequency of 147.8 Hz.

Resistor R44 shown in FIG. 4 may be used to trim or fine tune the range of the A/D converter 67. Resistor R43 should preferably be a 0.1% resistor. Resistor R43 must have a precise and stable value because its value determines the range of the A/D converter 67.

Figure 5:
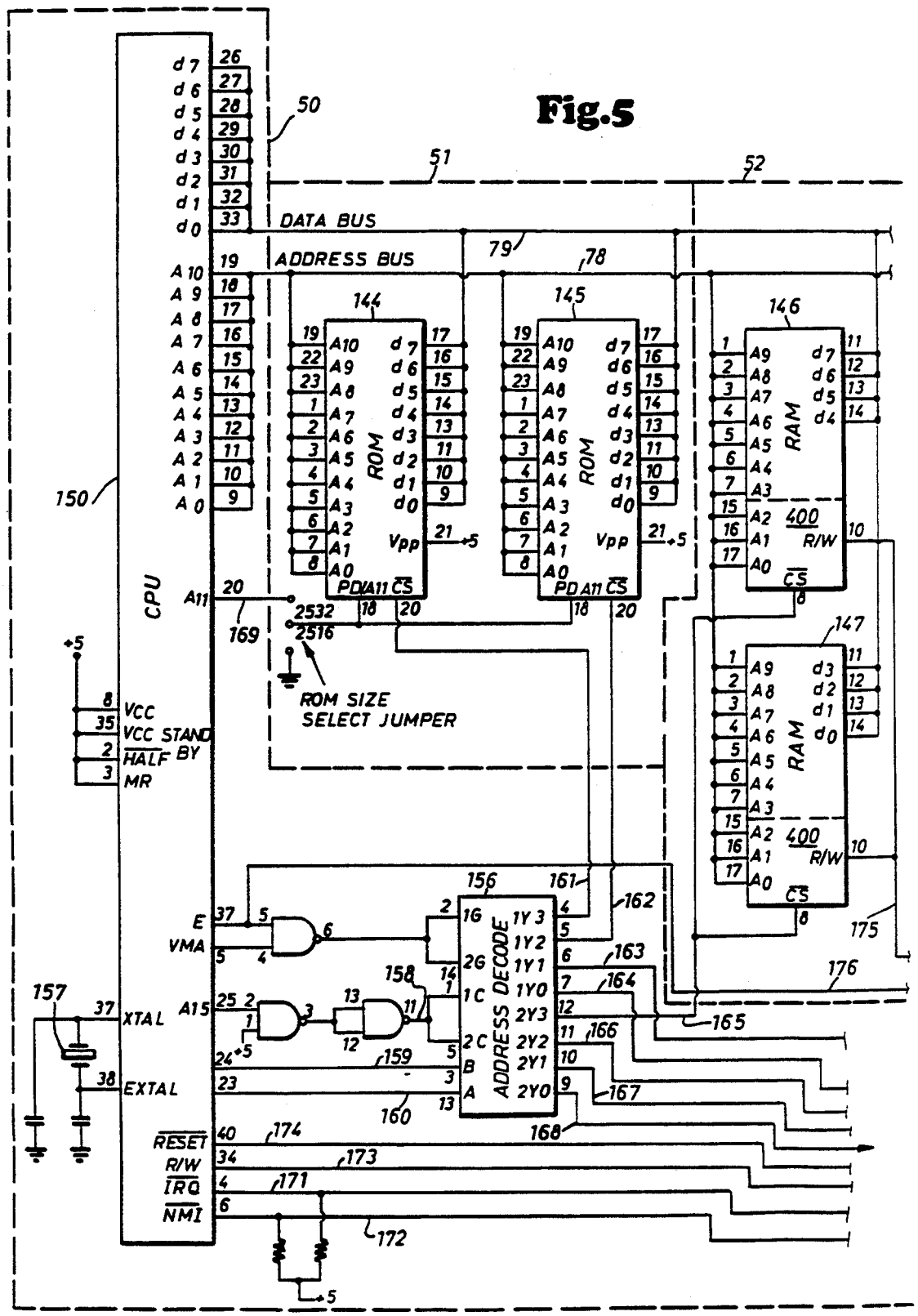
FIGS. 5 and 6 are schematic diagrams illustrating the CPU, the ROM, the RAM, and the bus interfaces for the timing function circuit, the serial I/O circuits, and the parallel I/O circuits.
Figure 6:
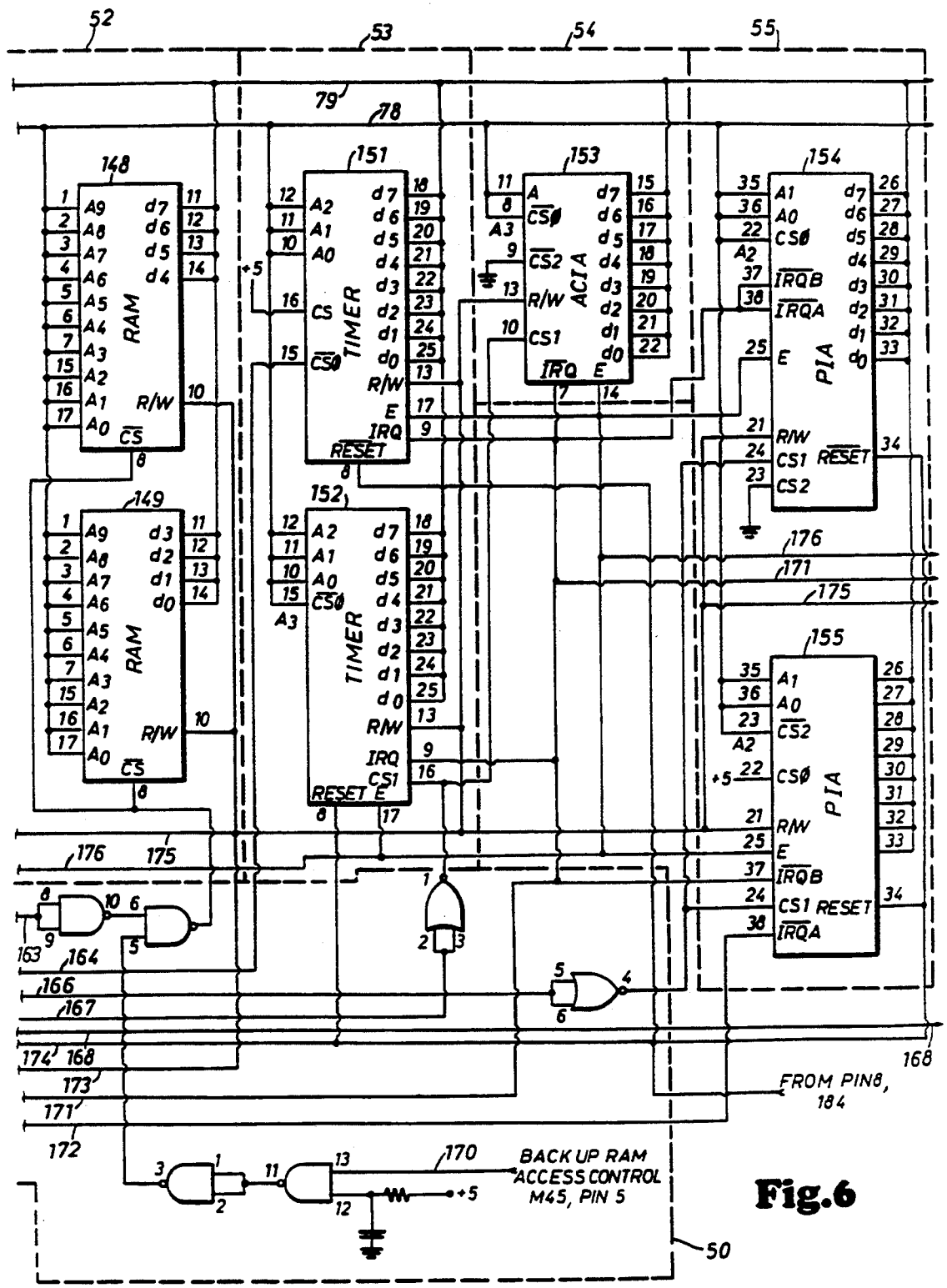
Figure 12:
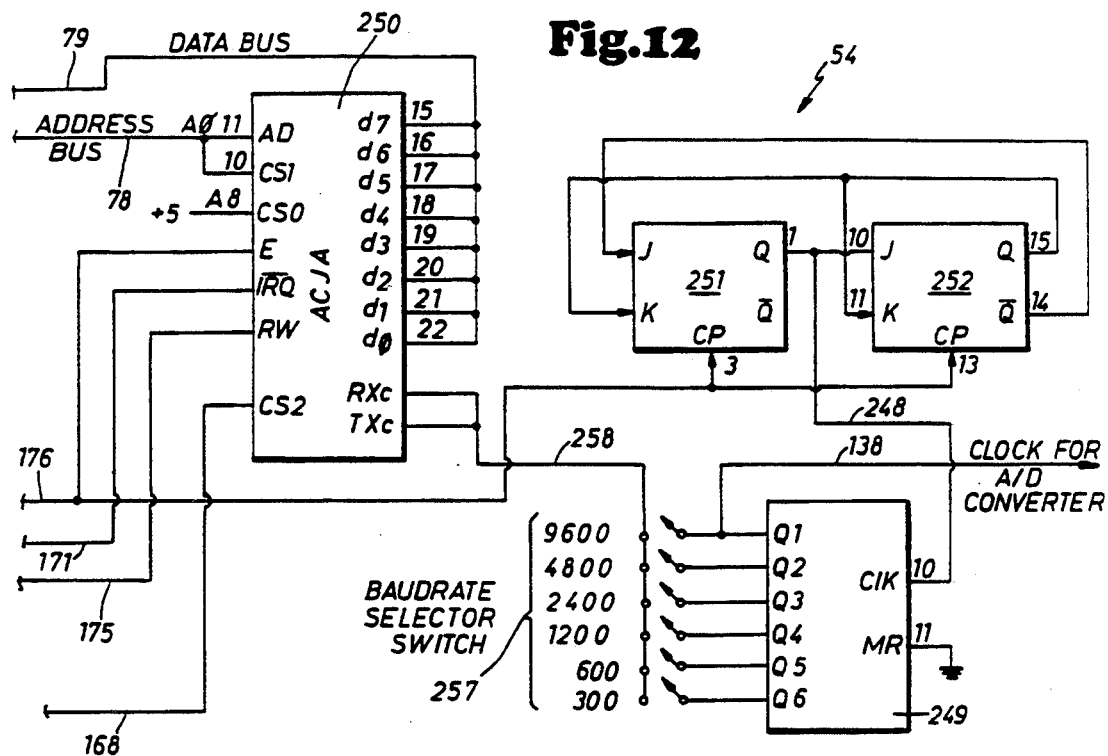
FIG. 12 is a schematic diagram illustrating the bus interface to one of the serial I/O circuits and its associated baud rate generator.

Operation of the CPU 50, ROM 51, RAM 52, timing function circuit 53, serial I/O controller 54 and parallel I/O controller 55 can best be understood will reference to FIGS. 5, 6, and 12.

In the illustrated embodiment shown in FIG. 5, the ROM 51 comprises two ROM chips 144 and 145.

In the illustrated embodiment, the RAM 52 includes RAM chips 146, 147, 148 and 149.

The CPU 50 includes a microprocessor 150. In a preferred embodiment, the microprocessor 150 may be a Motorola 6802 microprocessor. The microprocessor 150 may select a desired location of memory using the address bus 78 which is coupled to the ROM chips 144 and 145, and to the RAM chips 146, 147, 148 and 149. Information contained in memory is passed back and forth between the microprocessor 150 and memory 51 and 52 on the data bus 79.

The timer control circuit 53 includes a first triple timer chip 151 and a second triple timer chip 152.

The serial I/O controller 54 includes two asynchronous communication interface adaptors (ACIA), one of which is indicated in FIG. 6 by the reference numeral 153. The other ACIA is indicated with the reference numeral 250 in FIG. 12.

The parallel I/O controller 55 includes a first sixteen bit parallel port 154 and a second sixteen bit parallel port 155.

The second parallel port 155 includes output ports to output displays 75 and the SCR firing signal multiplexing circuit 66. Other outputs, which are illustrated in FIG. 1, are connected between the parallel port chips 154 and 155, but are not shown in FIG. 6.

Figure 11:
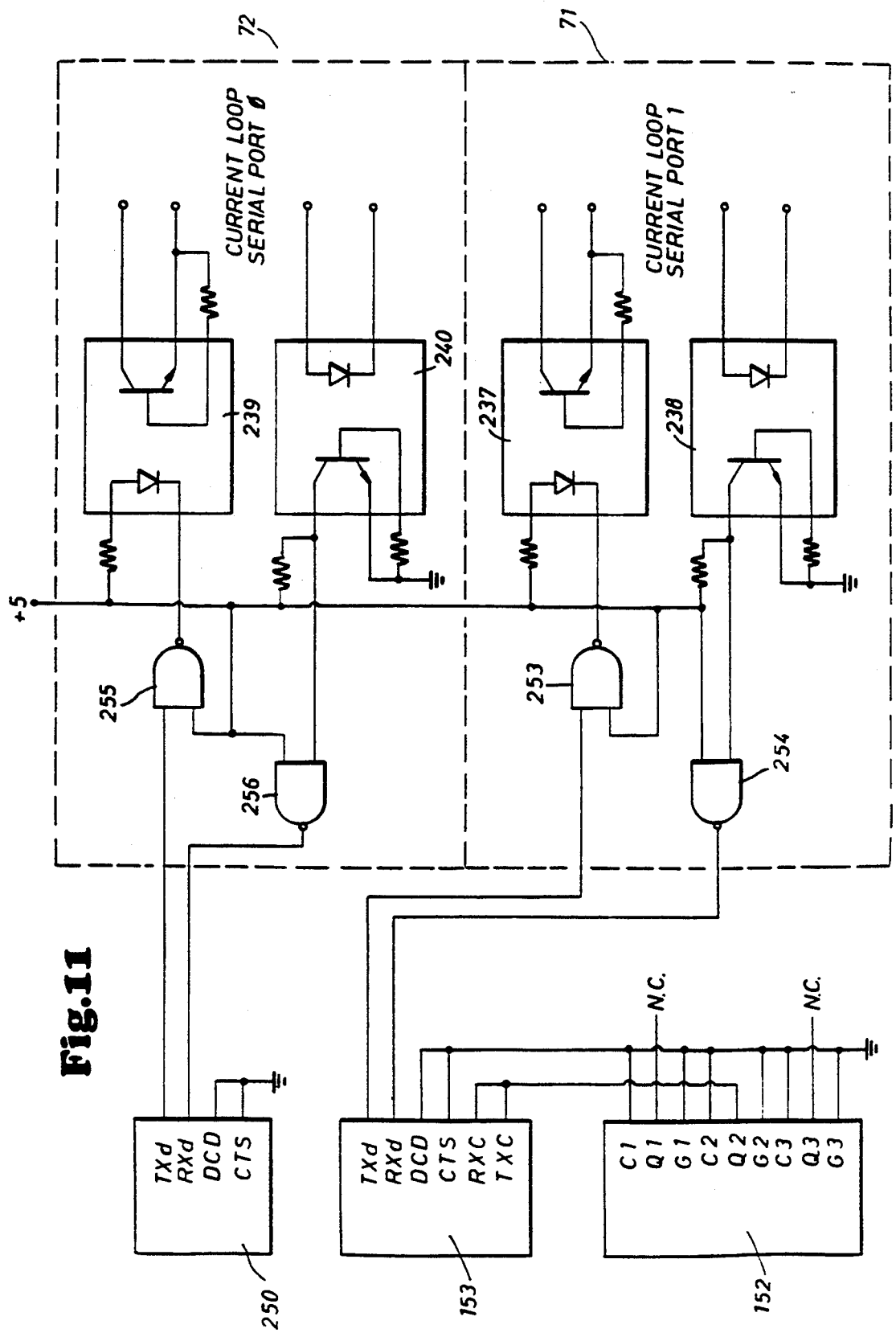
FIG. 11 is a schematic diagram illustrating the serial ports circuit, and current loop interface circuits associated therewith.

The interface adaptor (ACIA) 153 is connected to the current loop interface 71, as shown in FIG. 11 and FIG. 1, but which is omitted from FIG. 6.

A crystal 157 is provided for the microprocessor 150 to determine the clock frequency. In a preferred embodiment, the crystal 157 is a 3.579545 MHz crystal.

A ROM size select jumper 169 is provided to accommodate different sizes of the read only memory.

The microprocessor 150 uses a 74155 chip 156 as a means for signaling the ROM chips 144 nd 145, the RAM chips 146, 147, 148 and 149, the triple timers 151 and 152, the interface adaptors 153 and 250, and the parallel ports 154 and 155. The chip 156 functions as a means for decoding a three bit signal on control bit input lines 158, 159 and 160. The chip 156 has outputs 161, 162, 163, 164, 165, 166, 167 and 168. One of the outputs will go to a logic zero depending upon the three bit input appearing on control bit input lines 158, 159 and 160. This provides the CPU 50 with a means for signaling the ROM 51, RAM 52, timing function circuit 53, serial I/O controller 54 and parallel I/O controller 55 selectively, depending upon which device the CPU 50 needs to address.

If the microprocessor 150 is operating correctly and power is turned on, a signal on conductor 170 will enable the RAM chips 148 and 149.

Low priority interrupts may be communicated between the microprocessor 150 and the parallel ports 154 and 155, the interface adaptors 153 and 250, or the timers 151 and 152 along an interrupt request line 171. The microprocessor can elect to ignore or postpone response to interrupts which appear on the interrupt request line 171. The microprocessor 150 reads the polarity detector 64 to determine the polarity of the AC signal.

A read/write line 173 is used by the microprocessor 150 to determine the direction of the data bus 79.

In the embodiment illustrated in FIG. 6, the RAM chips 148 and 149 are used as battery back-up RAM.

Figure 7:
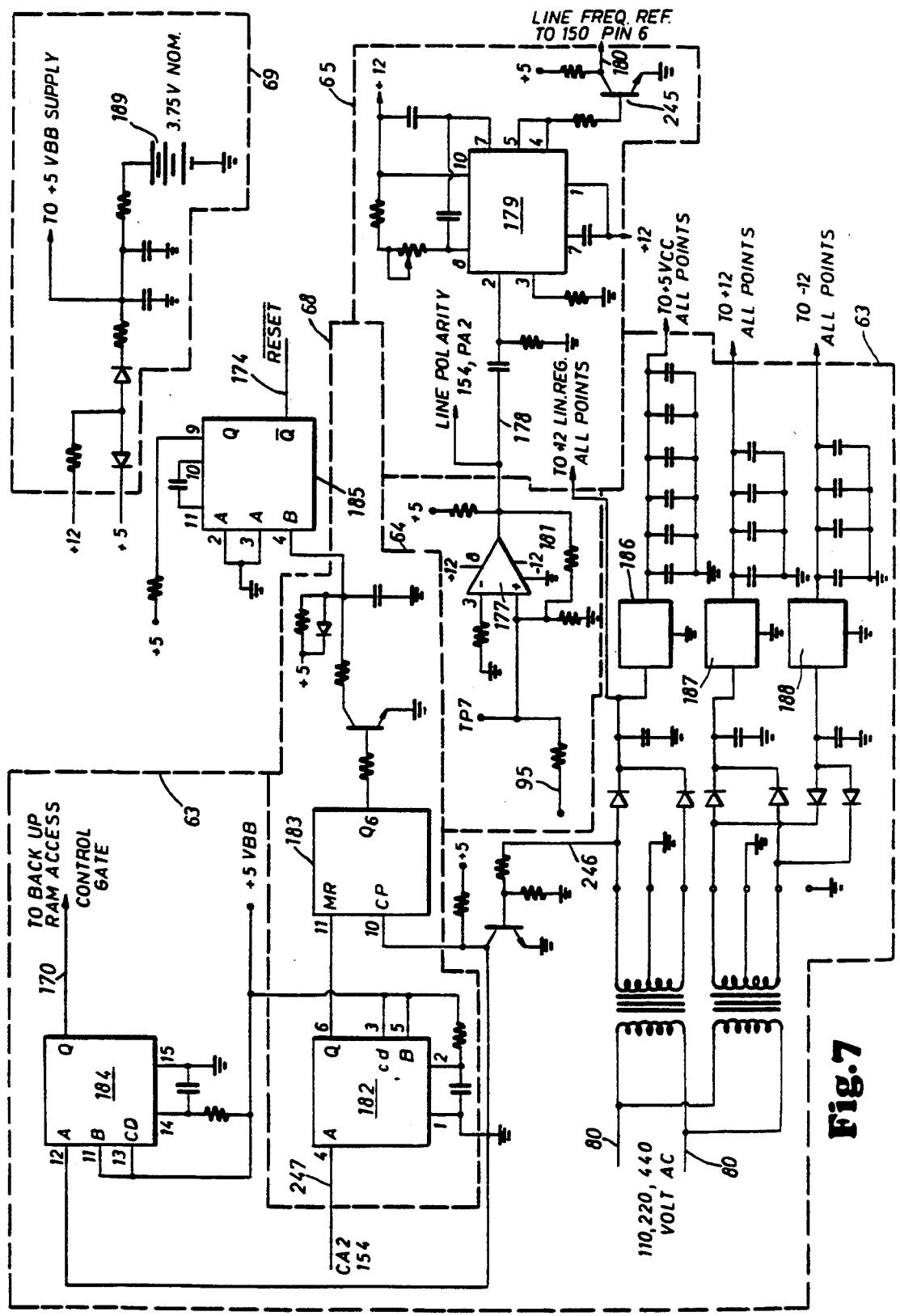
FIG. 7 is a schematic diagram illustrating the computer power supply, the phase locked loop and line polarity detector, the power on reset and watchdog reset circuit, and a portion of the battery backup circuit.

FIG. 7 illustrates in more detail the RAM battery back-up 69, the power supply 63, the phase locked loop 65, and the auto reset and watch dog timer circuit 68.

The phase locked loop 65 receives an input by conductor 95. The input signal is routed through a comparator 177. The output 178 of the comparator 177 can be used to detect the polarity of the alternating current signal on conductor 95. The output 178 of the comparator 177 is fed to an NE565 chip 179. The chip 179 will generate a sync output signal on conductor 180. The sync output signal then be used to determine the period (and thus the frequency) of the alternating current signal. The sync output 180 provides non-maskable interrupts to the microprocessor 150. The transistor 245 is used as a level shifter. A resistor 181 is used to provide hysteresis to de-bounce the signal from the transformer 57.

The auto reset and watch dog circuit 68 includes a one shot 182, a twelve bit binary counter 183, and a one shot 185. In the illustrated example, a 60 Hz count pulse is provided on conductor 246. If left to continue counting, the counter 183 would count up its maximum value and generate a reset signal on conductor 174 through one shot 185. However, if the CPU 50 is functioning properly, every few moments it signals on line 247 through one shot 182 to reset the counter 183. This keeps output Q6 of the counter 183 from going "high", which would generate a reset signal on line 174. The software program control is written so that the counter 183 will be reset periodically so that it never reaches its maximum value. However, if noise interference, radio frequency interference, or other factors cause the CPU 50 to hang up or get "lost," the CPU 50 will in most cases fail then to reset the counter 183 and a reset signal will generated on line 174 to reset the CPU 50.

The power supply 63 includes a one shot 184 to provide an enabling signal to back-up RAM. A five volt voltage regulator 186, and two twelve volt voltage regulators 187 and 188, are also provided.

The battery back-up circuit 69 includes a battery 189 which is connected to RAM chips 148 and 149.

Figure 8:
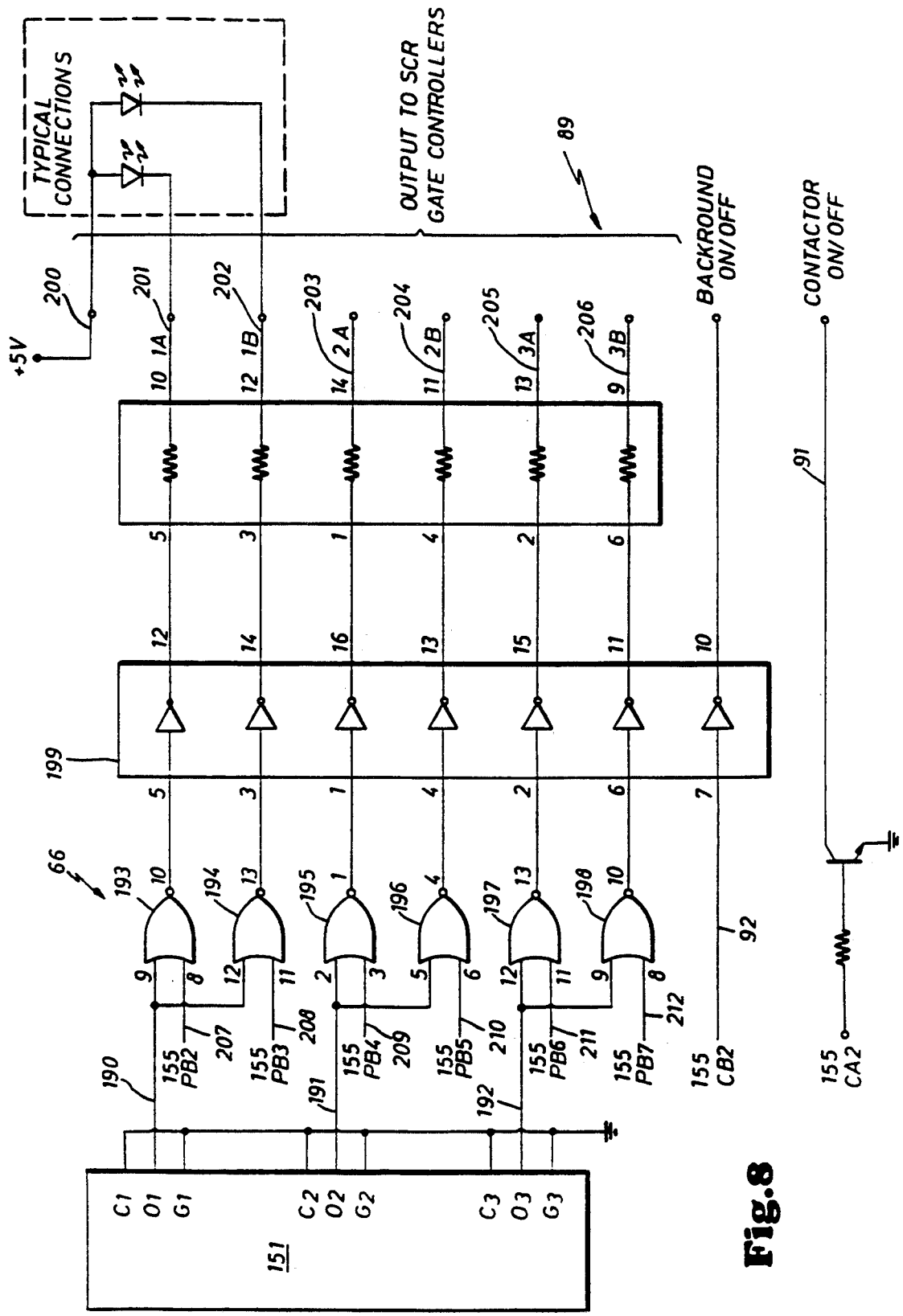
FIG. 8 is a schematic diagram illustrating the SCR timers and the SCR firing signal multiplexer.

FIG. 8 illustrates in more detail the SCR firing signal multiplexing network 68.

The microprocessor 150 selects a digital number to be loaded into each of the three timers contained in the triple timer 151. Each timer correspond to one of the three phases. The multiplexing circuit selects one of two SCRs 100 which share the same phase.

When the microprocessor 150 loads a number into one of the counters 151, the counter begins to count down or decrement until it counts to zero. When the counter reaches zero, the timer output 190 (in the case of the first timer) changes logical state from a logical one to a logical zero.

In the case of the first timer, when the timer counts to zero, the first timer output line 190 will change from a logical one to a logical zero. This signal will be fed to a NOR gate 193 and NOR gate 194. One of the NOR gates 193 or 194 will be enabled by an enable signal on NOR gate enable line 207 or 208. The NOR gates 193 and 194 provide multiplexing means for selecting the appropriate SCR to be fired when the first counter decrements to zero and generates a logical transition at the first timer output 190.

The signal from either gate 193 or 194 is coupled through a bank of drivers 199 and a bank of resistors 200 to gate signal line 201 or 202 respectively. Gate signal line 201 is connected through an SCR gate controller to one of the SCRs 100. Similarly, gate signal line 202 is connected through an SCR gate controller to one of the SCRs 100.

The second timer output 191 and the third timer output 192 are similarly coupled to an appropriate SCR 100 through multiplexing means including NOR gates 195, 196, 197 and 198.

As will be explained more fully hereafter, the microprocessor 150 selects the appropriate value to be loaded to the three timers in the triple timer circuit 151 in order to generate timer output signals at the first, second and third timer outputs 190, 191 and 192 at an appropriate time to fire the SCRs 100 in a manner which will achieve the desired level of current or voltage.

Figure 9:
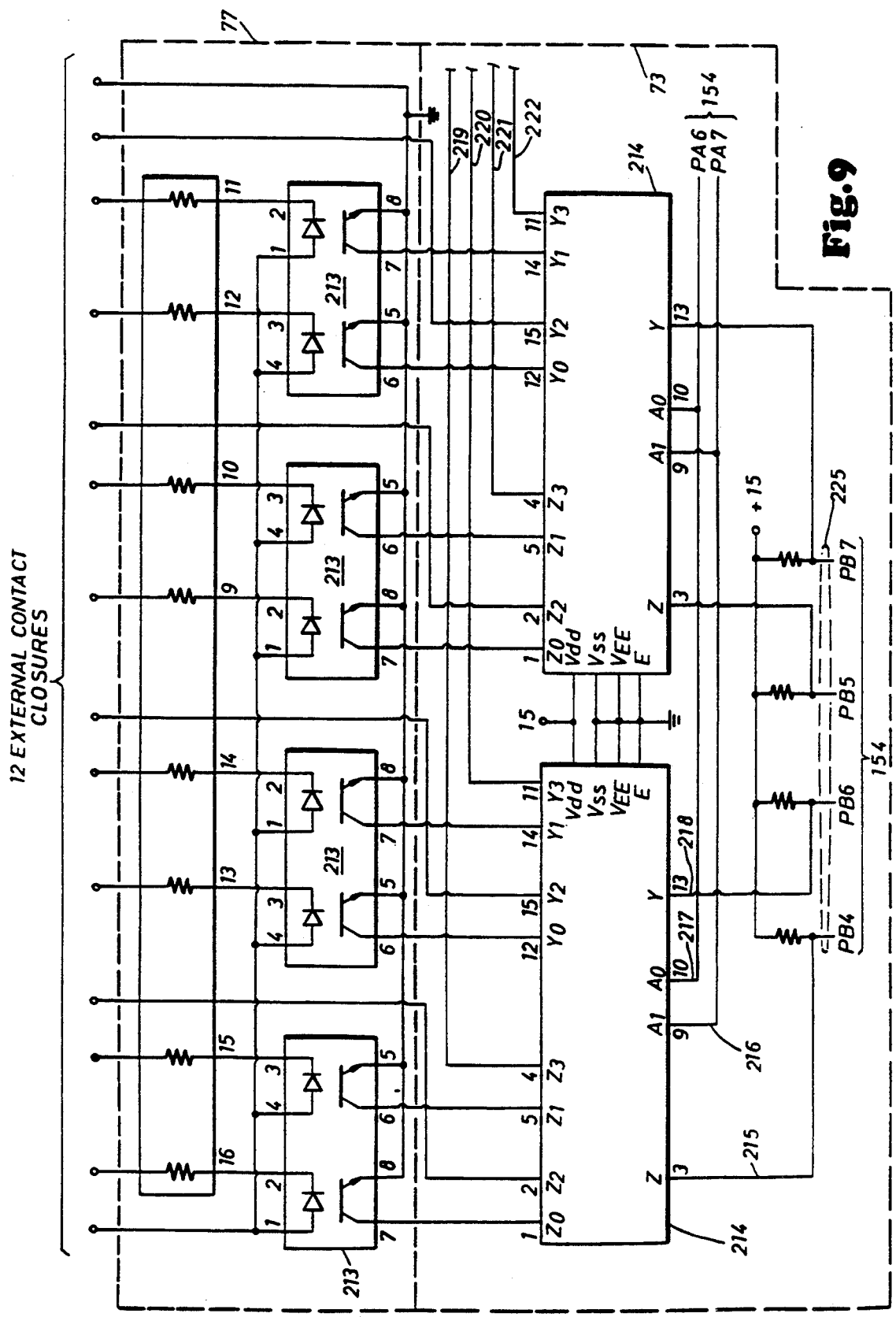
FIG. 9 is a schematic diagram illustrating the parallel port multiplexer and the opto-isolators circuit.

The parallel port multiplexer 73 and the opto-isolators 77 are illustrated in further detail in FIG. 9.

The opto-isolators 77 shown in the illustrated embodiment include four dual opto-isolator chips 213. The dual opto-isolator chips 213 are connected to external contact closures, such as panel switches, wire feed trigger switches, overheat trigger switches, and other external switches which provide input to the cpu 50. The dual opto-isolator chips 213 are fed into dual four input analog switches 214, which provide clean, bounceless signals which are more readily processed without error by the CPU 50.

The analog switches 214 function as the parallel port multiplexing circuit 73. The outputs 215 and 218 are selectively connected depending on the combination of bits appearing on select lines 216 and 217. The outputs 215 and 218 may then be selectively fed through the parallel I/O controller 55 to the CPU 50. Information is fed to the CPU 50 through a parallel port connected to cable 225.

Figure 10:
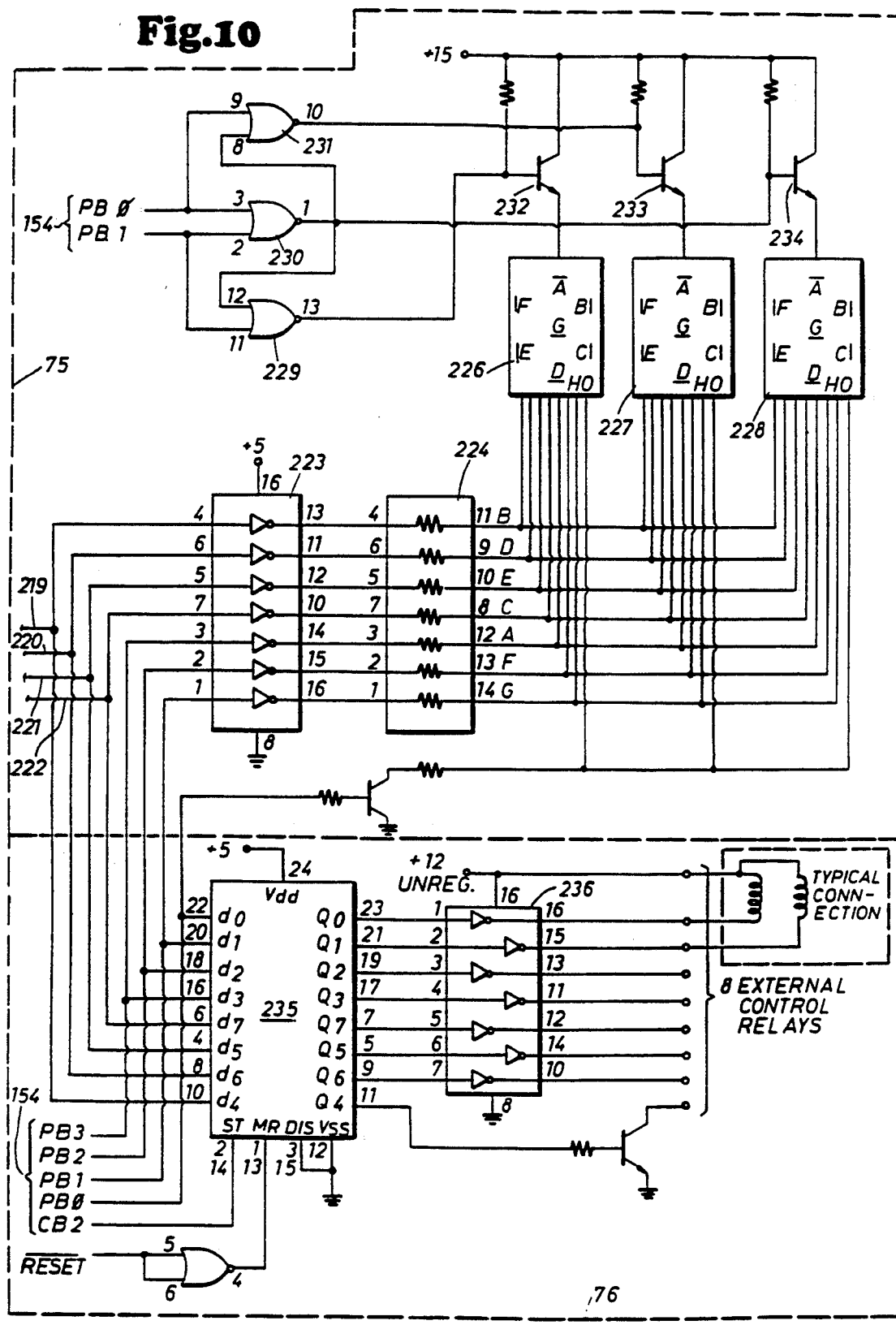
FIG. 10 is a schematic diagram illustrating the output displays and relay drivers circuits.

Driver bank 223 and resistor bank 224 illustrated in FIG. 10 are used to drive LEDs 226, 227 and 228 used for output displays 75. The LED displays 226, 227 and 228 are multiplexed using multiplexing means including gates 229, 230 and 231, and transistors 232, 233 and 234.

The relay driver circuit 76 is illustrated in further detail in FIG. 10, and includes an eight bit latch 235 and a driver bank 236. The output from the driver bank 236 may be fed to external contact relays to control the positioning of a workpiece, the feeding of wire during a welding operation, the actuation of the flow of inert gas to use as a shield during welding operations, etc.

FIG. 11 illustrates in further detail the current loop interfaces 71 and 72, and the interface side of serial I/O ports 153 and 250.

The asynchronous communication adaptor (ACIA chip) 153 is gated through NAND gates 253 and 254 to opto-isolators 237 and 238, which forms current loop 71. Section 2 of timer 152 generates the baud rate for ACIA chip 153. (Section 1 of timer 152 is used to generate interrupts at six times the line frequency.) Section 3 of timer 152 is used to measure the period of the phase locked loop 65, and thus the period of the AC line waveform.

The ACIA chip 250 is similarly gated through NAND gates 255 and 256 to opto-isolators 239 and 240, which forms current loop 72. The baud rate of serial I/O port 250 is determined by the circuit illustrated in FIG. 12. A square wave clock signal is coupled along clock line conductor 176 to JK flip flops 251 and 252. The flip flops 251 and 252 are configured to provide a divide by three function. This divided down signal is coupled along conductor 248 to a binary counter 249. The baud rate for serial I/O controller 250 is determined by the manual baud rate selector switch, indicated generally by the reference numeral 257. This is fed to the serial I/O controller 250 on line 258.

The clock for the A/D converter 67 is also conveniently provided by the baud rate circuit for the serial I/O controller 250.

It is desirable in a microprocessor controlled arc welding supply, to achieve an optimum trade off between hardware and software. If too much is left to the software, the program can become compute bound. Since this invention involves the real time control of welding operations, the apparatus is unlikely to function properly if it becomes compute bound. In the disclosed apparatus, interrupts are generated at six times the line frequency. The software must perform the task assigned to its fast enough so that it can adequately process the interrupts which are generated.

The disclosed apparatus senses the voltage and current. This is accomplished by the current and voltage sense elements 62. The CPU 50 processes this information by comparing it with the desired current or voltage level. The CPU 50 determines the amount of correction which must be signaled to the timing function circuit 53 so that the correct adjustment may be made in the firing signals fed along conductors 90 to the SCR bank 58 to adjust the welding signal appearing on conductor 98. The CPU 50 determines an appropriate adjustment to the amount of delay which is allowed to elapse between the moment in time that an SCR becomes forward biased, and the moment in time that a firing signal is sent to the gate 103 of the SCR 100 to cause it to conduct or "fire".

A significant feature of the present invention involves the use of look-up tables to determine the amount of adjustment which should be made to the SCR firing angles in order to correct the output on the common welding lead 81. Look-up tables are preferably precalculated and placed in RAM 52 prior to welding in order to save computer time.

The implementation of these and other features is accomplished in the illustrated embodiment. A review of the software program will assist in understanding the implementation of these features, a listing of which is appended hereto and labeled "Listing No. 1". The attached listings are incorporated herein by reference.

Consider, for example, that the arc welding supply is running in a constant voltage mode. The circuit would sample and store the value of the voltage at a particular moment in time, which value we may refer to as $V_t$. The next voltage sample may be referred to as $V_{t+1}$. At any particular moment during a welding procedure, the apparatus will have in memory a most recent voltage sample value $V_{t+1}$ and a previous sample value $V_t$. In a preferred embodiment, the apparatus will average $V_{t+1}$ and $V_t$, which we may refer to as $V_{avg}$. The apparatus will then compare $V_{avg}$ with reference voltage, which we may refer to as $V_{ref}$.

The reference voltage $V_{ref}$ represents the value that the voltage should have at that particular moment in time. In a constant voltage mode, of course, the value of $V_{ref}$ will be constant. However, it should be appreciated that $V_{ref}$ may change over time. For example, the voltage may be programmed to ramp from one value to another at a specified rate. In such an example, $V_{ref}$ will change over time, and the circuit will operate to adjust the welding voltage output to ramp in accordance with the changes in $V_{ref}$.

In a preferred embodiment it is also desirable to determine the first derivative of the voltage or current, as the case may be. More specifically, the first difference is determined for successive voltage samples. The first difference is computed as $V_{t+1}-V_t$.

It is undesirable to compute according to an algorithm the amount of adjustment which should be applied to the angle at which the SCRs 58 are fired. To do so would involve too much compute time and would not represent an optimum trade off between the hardware and software, which is critical in this invention. Significantly, in this invention look up tables 400 are utilized for determining the correction which should be applied to the SCR firing angles. An error is computed based upon the formula:

$$V_e = V_{avg} - V_{ref}$$

and a first difference is computed based upon the formula:

$$V_d = V_{t+1} - V_t$$

The CPU 50 uses the value of $V_e$ to point to a location in a look up table 400 which contains the value by which the SCR angle should be changed. The CPU 50 then takes the value obtained from the table 400 and transfers it to the timing function circuit 53 so that the value may be used to change the amount of delay used to determine the SCR firing angles.

The appropriate value in the look up table 400 for a given $V_e$ will vary based upon the value of the first difference $V_d$. Thus, the value of $V_d$ is used to determine which table 400 should be used by the CPU 50. That is, one table 400 is provided where $V_d$ is negative. A second table 400 of look up values is provided where V is positive. The CPU 50 first selects the appropriate table by examining the value of $V_d$, then selects the appropriate element of the look up tables 400 by examining the value of $V_e$.

Alternatively, this process may be conceptualized as a two dimensional table 400 in which $V_d$ is used to determine the column and $V_e$ is used to determine the row of the appropriate element whose value is used by the CPU 50 to signal the timing circuits 53 to adjust the firing angles of the SCR bank 58.

The look up tables 400 utilized in the preferred embodiment of the invention provide the speed which is necessary for an effective implementation of real time control of arc welding functions utilizing the features of the present invention. Although the above description is with reference to a constant voltage mode, the same principle applies for a constant current mode. The value of the elements in the look up tables 400 may be determined empirically.

In other words, it is desirable to provide a strong correction table and a weak correction table. The strong correction table provides a table of correction factors which provide relatively strong corrections to the variable, such as voltage or current, which is being controlled. Conversely, a weak correction table provides a table of weak correction factors which are applied to yield relatively weak changes in the factor, such as voltage or current, which is being controlled. The appropriate table may be selected by comparing the current voltage sample $V_{t+1}$ (or $V_{avg}$) with the reference voltage $V_{ref}$ to determine whether the voltage is above or below the desired setting. Then the first difference $V_d$ is examined to determine whether the voltage is rising or dropping. These two factors are used to determine whether the voltage is moving toward or away from the desired setting $V_{ref}$. If the voltage is moving toward the desired voltage setting, a weak correction table is used to adjust the voltage. If the voltage is moving away from the desired setting, the strong correction table is selected.

For example, if $V_{avg}$ is greater than $V_{ref}$ and $V_d$ is positive (indicating that the voltage is rising), the CPU 50 selects the strong correction table as the appropriate table to use as a look up table because the voltage sample is above the desired setting and rising, and is thus moving away from the desired setting.

The sign of the error $V_e$ is used to determine whether to add or subtract the adjustment which is provided by the look up table. The number which is obtained from the look up table is used as an adjustment which is applied to the current firing angle of the SCR bank 58.

Circuit operation may be best understood by referring to the software listing which is appended hereto and incorporated herein by reference. Skipping over the initialization procedures and service routines, the most recent voltage sample is picked up and processed by the steps near the label "DISOUT". The value of $V_{avg}$ is first computed. The value of the previous sample $V_t$ is stored in memory location labeled "DVSAM+3". This value is loaded in accumulator B. The current sample $V_{t+1}$ is then loaded from accumulator A into memory location "DVSAM+3". This saves the value of $V_{t+1}$, which will become the previous sample value for the next time=t+2.

The first difference is computed and stored in memory location "DVSAM+1". The sign of the first difference is stored in memory location "DVSAM+2". $V_{avg}$ is stored in memory location "DVSAM".

In a preferred embodiment, the values of memory locations which are used to output information to output display 75 are also updated.

It is desirable to be able to select a constant current or constant voltage mode without requiring hardware reconfiguration of the apparatus. In the present invention, this is significantly accomplished by software control. Specifically, the routine labeled "RAMP6" selects constant voltage or constant current operation of the apparatus. Importantly, this invention also allows for operation in other modes. For example, the apparatus is capable of operating in a constant power mode where the power (which is the product of the current times the voltage) is held constant.

In the example of a constant voltage mode, control branches to the routine labeled "FIXCV". It will be recalled that the value of $V_{avg}$ was previously loaded in memory location "DVSAM". The contents of DVSAM are loaded into accumulator B. The contents of accumulator B are then compared with the value of $V_{ref}$, which is stored in memory location "SETING". Program control then branches to routines "DECRV" or "INCRV" based upon the results of the comparison. If $V_{avg}$ is higher than $V_{ref}$, program control branches to routine "DECRV". Conversely, if $V_{avg}$ is less than $V_{ref}$, program control branches to routine "INCRV".

In the case where program control branches to routine "INCRV", the value of $V_{ref}$ is loaded into accumulator A. The apparatus then computes the value of $V_{ref}-V_{ref}$, which is the value of $V_e$. The circuit then loads register X with the contents of memory location "#TERRNM". Accumulator B is loaded with the contents of memory location "DVSAM+2", which contains the sign of the difference $V_d$.

The contents of accumulator B are shifted right one bit. Program control then branches on a carry clear (which is one means for branching depending on the sign of the first difference $V_d$). If the carried bit is not clear, then the next statement will be executed which causes the contents of memory location "#TERRM" to be loaded into register X, and consequently overwritten over the previous contents of register X. Then, in any event, program execution branches to routine "TVLOOK" which looks up the appropriate value of the table.

These steps are intended to load into register X the address of the first value in the appropriate look up table. The memory location "#TERRNM" contains the address of the first value in the strong correction table. The memory location "#TERRM" contains the address of the first value in the weak correction table. Thus, if the program logic determines that the strong correction table is not needed, the address of the first value of the weak correction table is overwritten over the previous contents of register X.

The routine "TVLOOK" takes the value of the error in the voltage $V_e$ which is at that time contained in accumulator A and adds it to the value of the address of the first element of the look up table (which at this time is in register X). This operation then gives the address of the table location which contains the correct adjustment value to be used to adjust the firing angles of the SCRs 58.

After returning from routine "TVLOOK", control then branches to subroutine "INCR". Routine "INCR" is used to modify the firing angle of the SCRs 58 and applies the correction to the firing angle of the SCRs which is obtained from the look up table. The routine subtracts the adjustment to the first angle and then returns.

Similarly, if $V_{avg}$ were higher than $V_{ref}$, control would have branched to routine "DECRV". In order to obtain a positive result, the order of subtraction of $V_{avg}$ from $V_{ref}$ is reversed in subroutine "DECRV". After branching to subroutine "TVLOOK" to look up the appropriate value for the look up tables, control branches to subroutine "DECR" which modifies the firing angle of the SCRs 58 by adding an adjustment to the firing angles.

Although the above example is described with reference to voltage, program control is similar in the example of a constant current control mode. In such a case, the routines "FIXCA", "INCRA", and "DECRA" are utilized along with subroutines "TVLOOK", "INCR" and "DECR" to determine the appropriate correction to the firing angles of the SCRs 58.

The look up tables, or error correction tables, may be calculated and set up in the case of voltage corrections, by the routine labeled "CALCVT", and subsequent routines. A separate voltage look up table is computed for converging voltage values, and for diverging voltage values, which are preferably calculated prior to welding to save computer time. In the case of current control, such as a constant current mode, look up tables or error correction tables may be calculated and set up using the routine "CALCAT" and subsequent routines. The tables are preferably precalculated to save computer time. A separate error look up table is provided for a converging current circumstances, and for a diverging current.

The look up tables may be modified during welding in order to empirically adjust the calculated values based upon results experienced while welding. This could be done during welding by the CPU 50. This would take the form of an artificial intelligence routine, where the CPU 50 evaluated the results of a correction applied to the firing angles of the SCRs 100, and used the results of that evaluation to "learn" a better adjustment parameter which would more closely approximate the adjustment parameter that was necessary to bring the welding output into correspondence with the reference value that was desired. A simple form of such a routine would be to add or subtract, as appropriate, a small amount from an adjustment parameter anytime that use of the adjustment parameter failed to bring the welding output into correspondence with the reference value (within predetermined tolerances, if desired). In other words, the CPU 50 could "tweak" the values in the look up tables and, in effect, make itself "smarter" as it modifies the tables on the fly during welding.

The routines beginning with the label "LINEIN" are used to read in and interpret user commands which are used to establish mode of operation and configuration, and, for example, to set values such as $V_{ref}$ which will be used for program control. In the case of a constant current mode, the user commands may be used to set the value of $I_{ref}$.

User commands may take the form of eight different types of commands. The different types of commands are "A" commands, "C" commands, "F" commands, "H" commands, "P" commands, "L" commands, "U" commands, and "Y" commands. These various commands form what may be referred to as the "user code".

Some examples of user commands are given in "Listing No. 2", which is incorporated herein by reference. "Listing No. 2" contains a listing of user codes to initiate a MIG welding procedure using the present invention. The left column contains line numbers. The center column contains the user code. The right column contains explanatory comments which describe the action taken by the welding apparatus in response to each user command.

Each user command has a two digit suffix, and a three digit operand field.

"A" commands are commands to set amps in the welding apparatus. "A" commands take the form:

Ann XXX where the letter "A" identifies the command as an "A" command, "nn" is a two digit suffix which identifies the particular "A" command that is used, and "XXX" is a three digit operand field. For example, "A00 XXX" sets the amps to zero (the operand is not used in this command).

The command "A01 XXX" sets amps equal to the value "XXX" (which must be in the range 0–255 amps). That is, the command "A01 050" would set up a constant current mode where the current was set equal to 50 amps. The command "A11 XXX" achieves the same function, except that "XXX" may be 0–510 amps. "A21 XXX" is similar, but "XXX" may be 0.996 amps.

The command "A02 XXX" will ramp to a current setting of "XXX" amps (0–255 mps). The ramp time must have been previously set with an appropriate ramp command. The command "A03 XXX" is similar, but program execution will not continue until the amp setting is reached. The range of amps that may be ramped to is increased to 0–510 amps for the "A12" and "A13" commands. The range is 0–996 amps for the "A22" and "A23" commands.

The command "A04 XXX" is used to compare the value of amps (where "XXX" is 0 to 255 amps), and is executed prior to a branch command which tests the results of such comparison and branches accordingly.

Similarly, the commands "A14 XXX" and "A24 XXX" extend the range of comparison to 0–510 amps and 0.966 amps, respectively.

The commands "A05", "A15", and "A25" are used to set the bio-feedback off limits. These commands set the amps at which welding power will down slope or shut down when output current falls or passes through this limit. Of course, the commands take the form "A05 XXX". The bio-feedback mode must have been previously turned on.

The commands "A06", "A16" and "A17" set the bio-feedback high limit. These commands set amps to an upper limit, when in the bio-feedback mode, which the output current cannot exceed while welding.

The "C" commands are also referred to as "GO TO" commands. The command "C01 XXX" branches unconditionally to an even line number given by the operand "XXX". It can be in the range 0–998.

The command "C02 XXX" is a branch if true command. It must be preceded by a test or compare command. If the test or compare returned a true condition (or "1"), then execution will branch to the even line number set in the operand "XXX". The test flag is used by this command. If the test flag is a "0", i.e., the test was false, execution passes to the user command on the next even line. The command "C03 XXX" is just the opposite, and will branch if false.

The command "C04 XXX" will branch if equal. It branches based on a test of a previous test or compare statement. The compare statement and branch statement must be in the same format, i.e., amps, volts, counter, etc. The command "C05 XXX" will branch if greater than. For example, if the voltage output of the apparatus is greater than the compare value, the program execution can be made to branch with this command. The "C06" command is similar, but the effect is branch if less than.

The commands "C07" and "C08" branch if the counter is 0, or not equal to zero, respectively. "C09" will cause a branch if the arc circuit is open, i.e., the arc failed.

Other "C" commands include "C10" (branch if ramping), "C11" (branch if clock elapsed), "C12" (branch if clock not elapsed), "C13" (branch subroutine), and "C14" (set start point for beginning execution of program).

The "F" commands are peripheral commands. The "F" commands may be used to generate the communication of digital data to the serial output ports 84 or 85. This data can be interpreted by a peripheral device to perform some function, such as turn on a motor to position the part to be welded, rotate a turntable at a predetermined speed, feed wire at a predetermined rate, etc. In the form "Fnn XXX" the command may be used to sand device "nn" the message "XXX", which may be coded as desired for the particular device used. The command "Fnn XXX" may be used to signal motor "nn" to rotate at speed "XXX".

The "H" commands are miscellaneous commands. "H00" is a no operation command, or null command. "H01" is a halt command, and waits for a manual stop or hand reset. "H02" stops execution of a program. "H03" causes the program to single step.

"H04 XXX" increases the counter by "XXX" (0–255), "H05 XXX" decreases the counter by the value of the operand "XXX". "H06 XXX" may be used to set the counter to the value "XXX" (0–255). "H07 XXX"

compares the counter to the value "XXX". This command is used immediately prior to a branch command.

The command "H08 000" turns the background supply 60 off. The command "H08 001" turns the background supply 60 on. Similarly, "H09 000" turns the main contactor 56 off, and "H09 001" turns the main contactor 56 on.

The commands "H10" and "H11" increase or decrease, respectively, the volts or current, setting a taper condition.

The command "H13" is a subroutine return.

The command "H18 000" turns off the bio-feedback loop. The command "H18 000" turns off the bio-feedback loop, where XXX is not equal to 000. the operand "XXX" sets a slow response time or slow steps if low, and a fast response time, large steps and very sensitive response if "XXX" in high. The operand "XXX" may be in the range of 0–255.

The "L" commands are time commands. For example, the command "L01 XXX" sets a delay for "XXX" seconds. For the L01 command, "XXX" may not exceed 25.5 seconds. The command "L11" allows a delay in the range of 0–255 seconds. "L" commands may be stacked for longer delays. "L02" sets the clock and proceeds. "L12" sets the clock in the range 0–255 seconds and proceeds.

The command "L03 XXX" sets the ramp time. The operand "XXX" may be 0–25.5 seconds. Usually used immediately preceding a ramp command, such as "A02 XXX". "L13 XXX" is a similar ramp function, where "XXX" is 0–255 seconds.

The "P" commands are test commands, and usually precede a branch command. "P02" tests a local switch "x" to determine if it is closed. In "Listing No. 2", this command is used to determine whether a turntable has been rotated to the proper position to open a microswitch, used to signal when the turntable is positioned properly for the weld. The operand "x" may be 1–8. The commands "P03" to "P31" similarly test banks of eight switches selected individually by an operand "x".

The "U" commands are voltage commands. The command "U01 XXX" sets the voltage to a value "XXX" in the range 0 to 45.0 volts DC. The command "U02 XXX" ramps the voltage to the value "XXX" (0–45.0 v). An "L03" or "L13" command should immediately precede this command, to set the time of the ramp. Similarly, "U03 XXX" ramps the voltage and waits. "U04 XXX" used to compare the voltage output of the apparatus with the operand "XXX". The "U04" command is usually used immediately preceding a branch command.

The "Y" commands are relay commands. "Y01" opens all relays. "Y02 XXX" will close local relays 1–8 for "XXX"=1–8, will close all 8 local relays for "XXX"=9, will open local relays 1–8 for "XXX"=19. Similarly, commands "Y03" to "Y31" will open or close banks of eight individually selectable relays for each instruction.

The user code is used to control the resilient operating program, referred to as the "executive code", which is listed in "Listing No. 1". Welding procedures are programmed using the user code, which is placed in the RAM 52. In the illustrated embodiment, the RAM 52 has a capacity of 1000 lines of user code, with each line consisting of three characters or digits. User program lines are numbered 000 to 999. In the illustrated example, even numbered lines are executable commands, for of the form "Ann". Odd numbered lines contain a three digit operand for the preceding even numbered line.

Programs may be manually loaded into RAM 52 by switches 74, preferentially four switches 74. Line numbers and program contents may be displayed on the LEDs. Each switch 74 may have a specific function.

The input switches 74 may be used to increase or decrease voltage or current, start execution, stop execution, modify the user code and program, load a new program, dump an existing program, etc. The user code in RAM 52 may be sent to a remote printer, tape punch, cassette tape, disk drive, magnetic tape drive, terminal, or computer for storage or recording for future use. Similarly, user code programs may be loaded into RAM 52 from similar such devices (including a card reader, paper tape reader, keyboard, as well as many of the above listed devices).

The present invention includes the significant feature of having the capability of switching from a constant current mode to a constant voltage mode, or vice versa, during a weld, without extinguishing or disturbing the arc. An example of this is shown in the user code of "Listing No. 3", which is incorporated herein by reference.

The MIG torch is switched down and local switch 1 tested until the torch locks in place. The command "Y02 005" closes relay 5 of switch bank 2 to switch the MIG gas on (i.e., the inert shield gas). The command "L01 02.0" delays for 2 seconds to allow the gas to purge air from the MIG torch. The command "Y02 006" closes relay 6 to switch the wire on. The command "U01 05.0" changes the voltage to 5 volts. The oscillator is switched on. The command "C09 352" retries if the arc fails. The commands "L03 00.2" and "U03 19.0" then ramp to a constant 19 volts in 0.2 seconds (once the arc has started). After a delay of 1 second, motor 1 moves forward at 26 percent of its maximum speed (see command "F01 026"). Command "L11 060" at line 36 causes a delay of 60 seconds, while the welding apparatus continues to weld in a constant voltage mode.

The apparatus then switches to a constant current mode at line 362, with the command "A01 125" (which sets amps to 125 amps), without extinguishing the arc. The command at line 364 ("L11 060") then delays for 60 seconds while the welding apparatus continues to weld in a constant current mode.

The command "F01 000" stops the motor, the apparatus delays 1.5 seconds (to finish the weld), the wire is switched off ("Y02 016"), and the apparatus ramps down to 0 amps in 0.3 seconds, with commands "L03 00.3" and "A02 00.0", at lines 372–375. The command "Y02 013" switches the oscillator off. After a delay of 4 seconds, the MIG gas is switched off with the command "Y02 015". Finally, the MIG torch is switched up with the command at lines 382–383, and the apparatus halts ("H02 000").

Thus, the apparatus can reconfigure itself from a constant voltage mode to a constant current mode, or vice versa, even during a weld, without requiring hardware reconfiguration or even extinguishing the arc.

A TIG touch start produce is shown in "Listing No. 4", which is incorporated herein by reference. The procedure is explained by the comments to the right of each user command.

The present invention includes a method of controlling a welding apparatus, which includes one or more steps. First, the step of sensing a first welding sample may be performed. This welding sample may be a sample of a voltage reading, or a current reading. In the case of voltage, the value would be $V_t$. The second step of sensing a second welding sample would be performed. The second welding sample would similarly be indicative of either a voltage or a current. The second value sensed would be, in the case of voltage, $V_{t+1}$.

The step of computing a first derivative parameter would be performed by setting $V_d = V_{t+1} - V_t$. That is, the first and second welding samples would be subtracted.

The step of computing a difference parameter would then be performed. The error parameter $V_e$ would be computed by subtracting the second welding sample from a predetermined control parameter $V_{ref}$.

The step of looking up an adjustment parameter from a table of predetermined correction factors would be performed. The location of the table which would be used to yield the correction factor would be determined by using the computed values $V_d$ and $V_e$.

The value returned from the look-up table would then be used to adjust elements which control the welding current or voltage. The timing circuits controlling the firing angle of the SCR bank 58 would be updated by the CPU 50 using the adjustment parameter.

The present invention also includes a method for touch starting the arc welding supply, for example, in a TIG welding mode. The steps of such a method may include the steps of setting a small voltage, for example ½ volt or 1 volts, between the work piece and the welding lead. (Note that, in contrast with the present invention, a conventional welding power supply would be at maximum voltage on the order of 80 volts at this point.)

The step of touching the tip to the work piece would then be performed. The current would be sensed to determine when the current started to flow, or the voltage could be sensed to determine when the voltage dropped to zero (indicating that the tip was shorted to the work piece). When current starts to flow, the welding power supply should be set to provide 1 amp constant current, or some other predetermined value which is preferably low. If desired, background voltage supply could be turned on, when setting the 1 amp constant current mode. The tip could be withdrawn slightly from the work piece in order to draw a thin weak arc. Note that in a conventional welding power supply, the current jumps to the set current value, which can result in a spot weld and the electrode can stick to the work piece.

The method includes the step of sensing the current or voltage to determine whether a thin arc has been successfully drawn between the work piece and the welding tip. If the flow of current is sensed (which will be held at a low value) then a thin arc has been successfully drawn. If the flow of current is not sensed, then the background voltage should be turned off, and the procedure should return to the initial step of no current and a low voltage on the order of 1 volt.

If a thin arc is successfully sensed, the step of ramping up the current to a predetermined desired value for welding may be accomplished. A typical current level desired may be on the order of 100 amps at 15 volts.

Conventional methods which have been attempted to start a TIG welding procedure include the use of high frequency pulses on the order of 15,000 to 20,000 volts. These high frequency currents can emit significant electromagnetic interference which can cause the malfunction of a robot welding device, as well as other equipment sensitive to EMI or RFI. Conventional attempts to scratch start can damage the tungsten tip of the welding electrode, as well as contaminate the work piece metal with tungsten.

It is desirable in a MIG touch start procedure to first heat the wire white hot momentarily to soften it before ramping up to full current. This lessens the tendency of the wire to "explode", and results in a smoother transition into the weld.

The present invention includes a preferred MIG start procedure. Such a procedure may include the steps of lowering the MIG torch, setting a constant voltage of a low predetermined value (such as 5 volts), switching the wire on, and testing for current. If the current equals 0, then the wire has not touched the part. The current is detected, and when it is not zero, the apparatus may, if desired, delay for a short predetermined period of time until the wire is, preferably, white hot. The voltage is ramped to a predetermined welding voltage over a predetermined period of time (for example, 19 volts). This will turn the wire to plasma and start the arc more smoothly than a conventional welding device, which is typically set at maximum voltage initially. The apparatus may communicate information through interfaces 71 or 72 which may be used to speed up the MIG wire feed rate to accomplish a smoother weld start.

The present invention also includes the method of arc tracking or seam tracking during a weld. Sometimes registering a part with a robot is a problem. It may oftentimes be desirable to detect the location of a seam in a part which is to be welded, and to constantly monitor tracking of the seam during welding. Using a feature sometimes referred to as arc length sensing, a robot can monitor welding conditions and interpret when the welding electrode is over the center of a seam which is being welded. The apparatus may monitor the voltage or current to determine whether the seam is being correctly tracked during welding. During a constant voltage welding mode, the current will be proportional to the length of the arc. During a constant current welding mode, the voltage will be proportional to the length of the arc. Thus, current or voltage can be monitored or sampled to provide information concerning whether welding is taking place correctly in the center of a seam, or whether the seam is not being properly tracked. Digital samples of parameters being monitored may be transmitted during welding to a robot or host computer so that corrections may be made for tracking purposes, as required.

The present invention also includes the method of bio-feedback. In this method, the voltage or current or both are sensed and a dip in the voltage or the current is interpreted by the CPU 50 as a command to increase or decrease the current or voltage a predetermined step value. Upper limits, as well as lower limits, may be set on the amount by which the voltage or current will be stepped up or down using bio-feedback. Bio-feedback may be used to eliminate the foot switches typically used with conventional TIG welding devices.

In an arc tracking mode, a change in the voltage or current may be interpreted as an indication that a command should be given by the CPU 50 to a robot device to correct movement of the work piece in a manner which will reestablish the correct value of voltage or current.

In a preferred embodiment, the welding transformer 57 is a constant voltage transformer. Tight coupling is provided between the primary and secondary windings. The transformer 57 is preferably designed to deliver high current, for example 1200 amps, at voltage on the order of 35 volts. The transformer 57 is preferably of a type which provides a very precise constant voltage. Constant current can be achieved using the disclosed structure through software control.

The present invention provides the capability of being able to wander over a part, sensing a background voltage and evaluating the voltage sensed in order to detect the topography of a part, which may be interpreted to reveal a proper position in which to activate welding current, based upon an evaluation of the sensed voltage or current. The voltage would be proportional to the arc length, assuming a constant arc current. If the electrode is maintained at a fixed height as the robot wanders over the part, the arc length information will depict the shape of the surface of the part. A robot could use this feature to measure an unknown part, remember where a seam is detected to be located, and then weld a path recorded in memory based upon such measurements. Using the feature of arc length sense, a seam which is to be welded could be automatically tracked by a robot device, or otherwise.

As described above, six interrupts are generated for each period of the AC cycle (one interrupt for each SCR 100 that is to be fired). The six interrupts divide the period of the AC wave form into six subperiods, which under typical conditions are preferably equal. Each interrupt is used as a reference for firing each individual SCR 100. In some circumstances, it is desirable to make the subperiods unequal.

The present invention provides the capability of individual settings for the firing angle of each SCR. Thus, imperfections in individual SCRs may be matched, complex wave forms may be generated, and greater flexibility is possible. More significantly, this capability may be used to compensate for phase mismatches in a power source, where the three phase power, for example, is not at exactly 120 degree phase shifts.

One additional example of an application when this invention's capability of individually adjusting the firing angle for each SCR 100 has significant advantages, is a welding mode which may be referred to as a "low spatter MIG mode". This mode may be similar to a mode commonly referred to in the art as "pulsed spray welding".

The significant features of the low spatter MIG mode may be best understood by reference to two conventional MIG modes commonly referred to in the art as (1) the "short arc" mode, and (2) the "spray transfer" mode. In the short arc mode, the wire used for welding typically touches the part being welded as it melts into the molten pool of metal at the weld site. In the spray transfer mode, the wire melts into the molten pool without touching the part.

The low spatter MIG mode may be thought of as a hybrid mode. In the low spatter MIG mode, the apparatus effectively switches back and forth between a relatively high and a relatively low voltage. In practice, this results in a low voltage in between the instants when the wire is burned away or melted at high voltage. For example, where in a conventional welding procedure a welding device might run at 19 volts, the present invention might operate in the low spatter MIG mode rapidly switching back and forth between, for example, 15 volts and 28 volts (which might result in a nominal or average voltage of 19 volts).

The low spatter MIG mode may be accomplished in accordance with the present invention by staggering the firing angles of the SCRs 100. By doing so, the output waveform on the common welding lead 81 will typically have a sawtooth-like waveform superimposed upon the DC voltage output. The average firing angle of the SCRs, and the average voltage, may remain the same.

The low spatter MIG mode reduces spatter (i.e., the number of sparks flying from the weld). The low spatter MIG mode has the advantage of minimizing the amount of metal wasted due to spatter during welding. In some applications, this can be significant.

The low spatter MIG mode offers additional advantages which are believed to the even more significant. This mode is believed to result in less overall heat input to the metal part to be welded. The heat input per inch (of weld) should be significantly lower. High temperatures eat costly energy and can easily distort parts being treated, sometimes even requiring post-finishing machining to restore dimensional tolerances.

The low spatter MIG mode provides operation over a wide range of wire feed rates. In the disclosed apparatus, an operator may easily adjust the rate of welding by conveniently adjusting the wire feed rate (because the amps will be automatically adjusted by the apparatus). The operator will be able to conveniently adjust the amount of metal deposited during a weld, as desired. A relatively low deposition rate may be achieved with the present invention, as compared with conventional devices.

In the illustrated embodiment, the low spatter MIG mode may be accomplished by staggering the SCR firing angles. The SCR firing angles may be staggered using the user code commands "H14 XXX" and "H15 XXX". The command "H14" is used to set the value of the variable "DIG" used in "Listing No. 1" to adjust the amount of time that the SCR firing angles may be delayed or advanced. The command "H15" is used to adjust the staggering of the SCR firing angles by adjusting the value of the variable "RASP" in "Listing No. 1".

Referring to the sawtooth-like wave form that is superimposed upon the DC voltage output at the common welding lead 81, the variable "DIG" affects how high the sawtooth-like "teeth" are, while the variable "RASP" affects the spacing of the "teeth", and can be used to make the "teeth" further apart.

For example, the command "H14 001" sets "DIG"=1. This causes each SCR 100 to fire at a time spaced one unit from the mean firing time (determined by the six equal subperiods of the AC cycle). The command "H15 001" sets "RASP"=1 and results, in this example, in the first SCR 100 firing one unit of time-early, the second SCR 100 firing one unit of time late, the third SCR 100 firing one unit of time early, the fourth SCR 100 firing one unit of time late, the fifth SCR 100 firing one unit of time early, and the sixth SCR 100 firing one unit of time late.

The command "H14 002" ("DIG"=2) cases the SCRs 100 to fire two units of time spaced from the mean, in the order determined by the variable "RASP". The command "H14 003" sets "DIG"=3, etc.

The command "H15 002" sets "RASP"=2. In such a case, the first SCR 100 would fire early, the second SCR 100 would fire early, the third SCR 100 would fire late, the fourth SCR 100 would fire late, the fifth SCR 100 would fire early, and the sixth SCR 100 would fire early, etc.

The combination of commands "H14 002" and "H15 001" have yielded satisfactory results in practice.

The disclosed invention offers significant features and can accomplish significant results unavailable with most conventional welding devices.

For example, in a tungsten inert gas (TIG) mode, the disclosed apparatus may be used to affect agitation of the pool of molten metal at the weld site. This can have significant advantages, for example, where alloys of different metals which tend to separate when molten are being used. Agitation of the molten metal can be used to keep such alloys generally evenly distributed in the molten pool.

The present invention may be advantageously used to help penetrate oxide films. The low spatter MIG mode, for example, may be used.

The present invention may be used, for example, to run a TIG mode in reverse polarity (electrode positive), or a MIG mode in straight polarity (electrode negative). These features may be used to affect the structure of a weld and to allow additional performance features of a weld. In a MIG weld of straight polarity, the metal tends to lay on top of the weld. This is typically not a stable process in conventional welding machines, but is stable in the present invention. The present invention may be used to put down weld deposits of low dilution, and maintain stability.

A feature of the present invention that is potentially of great significance, involves the ability to control the dilution rate of a weld. This feature may be used to affect, and control, the metallurgy of a weld. The invention may be used to empirically achieve a desired metallurgy of a weld, and once achieved, the invention is capable of faithfully reproducing the same weld due to its ability to remember a detailed welding procedure and repeatedly follow such procedure exactly. Human operated conventional welding devices are not capable of such repeatability. The present invention may be used to achieve minimal dilution rates significantly better than prior art devices. The article entitled "Surface Magic: Making Metals Tougher", published in High Technology (March, 1983(which is incorporated herein by reference),states that the following dilution percentages are achievable with conventional welding:

| | |
|---|---|
| Gas tungsten-arc and plasma-arc welding | 5–15% |
| Stick welding (bare electrode) | 20–25% |
| Stick welding (coated electrode) | 30–40% |
| Submerged arc welding | 40–50% |

The present invention can achieve significant minimal dilution rates, believed to be on the order of 5% or less.

The present invention may be used to precisely control the temperature of a weld, a feature not available in conventional welding devices.

The present invention provides a significant advantage in its ability to achieve unusually long "stick out lengths" of the wire used in MIG welding. "Stick out length" is sometimes defined in the art as the length of the welding wire or wire electrode, between the contact tip and the arc. In *Welding Handbook* (7th ed., Vol. 2 1978), published by the American Welding Society, stick out length is defined at page 139 as "electrode extension". This *Welding Handbook*, Volumes 1 through 5, are all incorporated herein by reference. The stick out length is the distance between the last point of electrical contact, usually the contact tip, and the end of the electrode, which usually ends at the arc.

Conventional welding devices are believed to be able to achieve typical stick out lengths of a MIG wire electrode of ½ inch. The present invention is capable of achieving stick out lengths as great as 3 inches (for 0.035 wire). These along stick out lengths have significant advantages. Such unusually long stick out lengths enable the apparatus to conveniently preheat the electrode wire and to utilize whole new concepts in nozzle design.

The wire electrode acts as a resistor over its length between the last point of electrical contact and the arc. The current flowing through the wire electrode tends to preheat the electrode, and this action is significantly improved by achieving long stick out lengths. This feature is believed to assist greatly in achieving extreme deposition rates.

Although the operation of the invention is not completely understood, the present invention is capable of controlling welding parameters so tightly, that long stick out lengths are believed to be achievable as a result.

Typical nozzle designs must use complicated water cooled arrangements due to the close proximity of the nozzle to the hot arc. Long stick out lengths permit new concepts in nozzle design, by allowing location of the nozzle at a point spaced from the arc a sufficient distance to permit lower temperature designs. New materials like ceramic materials may be used in the nozzle design.

ALTERNATIVE EMBODIMENTS

The present disclosure illustrates a presently preferred embodiment of the invention. Other embodiments of the invention may be advantageous in some applications.

For example, the disclosed arc welding circuit outputs a DC signal on the common welding lead 81. In some applications, it may be desirable to utilize an AC current. For example, it may be advantageous to weld a metal such as aluminum using AC current in a constant current mode. Alternating current is sometimes used in the case of aluminum to remove or inhibit the formation of an oxide film which would otherwise interfere with the maintenance of a good arc.

The illustrated example utilizes three phase power. Single phase power could be used. That is, the welding transformers 57 could be single phase. Also, for example, six phase power could be used. Three SCRs could be used instead of six.

The transformer 57 could be eliminated. The secondary windings 99 could be eliminated and replaced with windings on a three phase alternator, such as a portable diesel alternator. Such a configuration would provide an excellent portable welding apparatus. The disclosed invention is especially powerful in its ability to synchronize with a power source that varies in frequency.

Greater resolution of voltage or current samples could be achieved by using a ten bit or greater A/D convertor 132. This could result in 0.025 volt resolution, or greater. For example, a fourteen bit A/D converter 132 could be utilized.

A sample and hold technique could also be used. However, such techniques are not necessary in a preferred embodiment. The voltage reading is taken so fast in comparison to the rate of change of the voltage, that the voltage may be considered to remain constant as a practical matter during the short time involved in taking the reading.

The illustrated embodiment uses an averaging type voltage or current reading. The circuit employs capacitors and resistors to, in effect, integrate voltage sample inputs. Alternatively, op amp circuits could be placed in the invention and configured to result in a time RMS A/D reading circuit so that the digital value returned by A/D convertor 132 represented the value of the time RMS voltage being read.

A cathode ray tube (CRT) could be used in lieu of, or in addition to, the output displays 75. A printer may be coupled to, e.g., current loop interface 71. The printer may be used to print voltage or current, or both, for time intervals (say each second) during a welding procedure. This information may be used for quality control. If an abnormal reading occurred in the print out, it could be indicative of a flaw in the weld. Quality control can be critical in some applications, such as welds on a pipeline or aircraft.

A smart interface chip could be provided to time the output displays 75. Thus, the responsibility for strobing the LED displays 75 and keeping them lit could transferred to a smart interface chip which could then maintain the same display until changed or updated by the CPU 50.

In some dedicated applications, the flexibility and programmability offered by the illustrated preferred embodiment may not be needed. In such event, the CPU 50 may be replaced by a programmed logic array (PLA), for example. Predetermined welding procedures could be stored in either ROM 51 or RAM 52, and could be selected by a menu driven routine, for example. The look up tables could be predetermined and stored in ROM 51 or RAM 52. In any embodiment the look up tables may be stored in ROM 51 if it is not desired to modify the look up tables.

What is claimed is:

1. A method for touch starting a microprocessor controlled welding power supply operating in a TIG mode, comprising the steps of:
    setting a small voltage between a work piece and a welding lead;
    moving the tip of the welding torch toward the work piece;
    sensing when the tip of the welding torch touches the work piece;
    initiating under microprocessor control a welding current flow at low current sufficient to create an arc of welding current, but sufficiently low to avoid contamination of the work piece, responsive to the sensed touching of the welding torch to the work piece;
    withdrawing the tip of the welding torch slightly from the work piece in order to draw an arc of welding current;
    sensing the current or voltage to determine whether an arc has been successfully drawn between the welding torch and the work piece;
    if an arc has been successfully drawn, then gradually increasing under microprocessor control the welding current to an operator determined magnitude for welding.

2. The method as disclosed in claim 1, further comprising the step of repeating each step while increasing the small voltage between the work piece and the welding lead if an arc has not been successfully drawn.

3. The method as disclosed in claim 1, wherein the welding current is gradually increased under microprocessor control by ramping the magnitude of the welding current.

4. The method as disclosed in claim 1, further comprising the step of preventing the initiation of welding current flow when the tip of the welding torch exceeds a predetermined temperature.

5. A method for touch starting a microprocessor controlled welding power supply operating in a MIG mode, comprising the steps of:
    setting a small voltage between a work piece and a welding wire;
    moving the wire toward the work piece;
    sensing when the wire touches the work piece;
    delaying for a predetermined period of time while the wire is heated by current flow through the wire; and
    increasing under microprocessor control current through the wire to turn the tip of the wire to a plasma-like state for welding.

6. The method for touch starting a microprocessor controlled welding power supply according to claim 5 further comprising the step of:
    increasing under microprocessor control the speed at which the wire is moved toward the work piece when the current is increased to turn the tip of the wire to a plasma-like state for welding.

* * * * *

UNITED STATES PATENT AND TRADEMARK OFFICE
CERTIFICATE OF CORRECTION

PATENT NO. : 5,343,016
DATED : August 30, 1994
INVENTOR(S) : Clint A. Davis

It is certified that error appears in the above-indentified patent and that said Letters Patent is hereby corrected as shown below:

Column 1, line 23-24, "present-ing" should be -- present in --.

Column 3, line 39, "mans" should be -- means --.

Column 4, lines 25-26, "derives" should be -- devices --; line 52, "disconnection" should be -- disconnecting --

Column 5, line 16, "example of" should be -- example by --.

Column 9, line 7, "accomplished" should be -- accomplish --; line 11, "may the" should be -- may then --; line 15, "is positive" should be -- in positive --; line 18, "output 84" should be -- outputs 84 --.

Column 10, line 2, "movement" should be -- moment --; line 31, "lads" should be -- leads --;

Column 13, line 60, "which 110" should be -- switch 110 --.

Column 14, line 36, after "signal" insert -- on --; "inverts" should be -- inverters --.

Column 15, line 20, "two" should be -- too --; line 45, "1480L8" should be -- 1408L8 --.

Column 16, line 32, "nd" should be -- and --.

UNITED STATES PATENT AND TRADEMARK OFFICE
CERTIFICATE OF CORRECTION

PATENT NO. : 5,343,016
DATED : August 30, 1994
INVENTOR(S) : Clint A. Davis, et. al.

It is certified that error appears in the above-indentified patent and that said Letters Patent is hereby corrected as shown below:

Column 17, line 4, after "signal" insert -- may --; line 28, after "will" insert -- be --; line 36, "network 68" should be -- network 66 --.

Column 18, line 15, "cpu 50" should be -- CPU 50 --.

Column 19, line 10, "its" should be -- it --; line 50, after "with" insert -- a --.

Column 20, line 30, "Vis" should be -- $V_d$ is --.

Column 21, line 60, "$V_{ref}$" (first occurrence) should be -- $V_{avg}$ --.

Column 22, line 31, "first" should be -- firing --.

Column 23, line 55, "0.996" should be -- 0-996 --.

Column 25, line 13, ""H18 000"" should be -- "H18 XXX" --; "off" should be -- on --; line 14, "the" should be -- The --; line 17, "in high" should be -- is high --; line 49, after ""U04 XXX"" insert -- is --; line 56, after "relays 1-8" insert -- for "XXX" = 11-18, and will open all local relays --.

UNITED STATES PATENT AND TRADEMARK OFFICE
CERTIFICATE OF CORRECTION

PATENT NO. : 5,343,016
DATED : August 30, 1994
INVENTOR(S) : Clint A. Davis, et. al.

It is certified that error appears in the above-indentified patent and that said Letters Patent is hereby corrected as shown below:

Column 27, line 8, "$V_d - V_{t+1} - V_t$" should be -- $V_d = V_{t+1} - V_t$ --; line 29, "volts" should be -- volt --.

Column 30, line 13, "to the" should be -- to be --; line 59, "cases" should be -- causes --.

Column 31, line 42, "(March, 1983" should be -- (March, 1983) --.

Column 32, line 7, "along" should be -- long --.

Column 33, line 24, after "could" insert -- be --.

Signed and Sealed this

Twenty-fourth Day of January, 1995

*Attest:*

BRUCE LEHMAN

*Attesting Officer*   *Commissioner of Patents and Trademarks*